(12) United States Patent
Kim et al.

(10) Patent No.: US 6,460,382 B1
(45) Date of Patent: Oct. 8, 2002

(54) STRUCTURE OF DRIVING UNIT IN DRUM TYPE WASHING MACHINE

(75) Inventors: Jae Kyum Kim; Ho Cheol Kwon; Jong A Park; Kang Mo Choi, all of Kyongsangnam-do (KR)

(73) Assignee: LG Electronics Inc., Seoul (KR)

( * ) Notice: Subject to any disclaimer, the term of this patent is extended or adjusted under 35 U.S.C. 154(b) by 134 days.

(21) Appl. No.: 09/624,144

(22) Filed: Jul. 21, 2000

(30) Foreign Application Priority Data

Oct. 18, 1999 (KR) ............................................ 99-45088
Oct. 18, 1999 (KR) ............................................ 99-45089

(51) Int. Cl.[7] ............................................... D06F 37/30
(52) U.S. Cl. ....................................................... 68/140
(58) Field of Search ................................. 68/12, 16, 24, 68/140

(56) References Cited

U.S. PATENT DOCUMENTS

| | | | | |
|---|---|---|---|---|
| 5,809,809 A | * | 9/1998 | Neumann | 68/140 |
| 5,862,686 A | | 1/1999 | Skrippek | 68/140 |
| 5,996,379 A | * | 12/1999 | Skrippek | 68/140 |
| 6,050,113 A | * | 4/2000 | Skrippek et al. | 68/140 |
| 6,131,422 A | * | 10/2000 | Skrippek et al. | 68/140 |
| 6,148,647 A | * | 11/2000 | Kabeya et al. | 68/140 |
| 6,341,507 B1 | * | 1/2002 | Rode et al. | 68/140 X |

* cited by examiner

Primary Examiner—Philip Coe
(74) Attorney, Agent, or Firm—Fleshner & Kim, LLP

(57) ABSTRACT

Structure of driving unit in a drum type washing machine including a tub mounted inside of a cabinet, a drum mounted inside of the tub, a shaft connected to the drum mounted inside of the tub for transmission of a driving force from a motor to the drum, a front bearing and a rear bearing mounted on an outer circumference of the shaft at opposite end portions thereof respectively, a bearing housing built in a central portion of a rear wall of the tub for supporting the front bearing, a rotor composing the motor together with the rotor, and coupled to the rear end portion of the shaft, a stator fixed to the tub rear wall inward of the rotor to compose the motor together with the rotor, a connector serration coupled to the outer circumference of the shaft in front of the rear bearing and fixed to the rotor, for transmission of a rotating power from the rotor to the shaft, and a bearing bracket fixed to the rear wall of the tub to cover an outside of the rotor and support the rear bearing, thereby reducing noise, repair and power loss, by improving a structure of a driving unit, improving a product reliability, by improving a washing capability, and improving a productivity by improving workability in fabrication of components of the driving unit.

34 Claims, 10 Drawing Sheets

STRUCTURE OF DRIVING UNIT IN DRUM TYPE WASHING MACHINE

BACKGROUND OF THE INVENTION

1. Field of the Invention

The present invention relates to a drum type washing machine, and more particularly, to a structure of a driving unit in a drum type washing machine.

2. Background of the Invention

In general, a drum type washing, making washing by using friction between a drum rotated by a motor and laundry in a state detergent, washing water, and the laundry are introduced into the drum, provides effects of beating and rubbing washing, but gives almost no damage to the laundry, and shows no entangling of the laundry. A structure of a related art drum washing machine will be explained with reference to FIG. 1. FIG. 1 illustrates a longitudinal section of a related art drum type washing machine, provided with a tub 2 mounted inside of a cabinet 1, a drum 3 rotatably mounted on a central portion of inside of the tub 2. There is a motor 5a under the tub 2 connected with a pulley 18. There is a drum shaft connected to a rear of the drum 3, to which a drum pulley 19 is coupled. And, the drum pulley 19 on the drum shaft and the motor pulley 18 connected to the motor 5a are connected by a belt 20 for transmission of power. And, there is a door 21 in a front part of the cabinet 1, with a gasket 22 between the door 21 and the tub 2. There is a hanging spring between an inside of an upper portion of the cabinet 1 and an outside of an upper portion of the tub 2, and a friction damper 24 between an inside of a lower portion of the cabinet 1 and a lower side of an outside of the tub 2 for damping vibration of the tub 2 generated during spinning.

However, the related art washing machine has the following disadvantages since driving power of the motor 5a is transmitted to the drum 3 through the motor pulley 18, and the drum pulley 19, and the belt 20 connecting the motor pulley 18 and the drum pulley 19.

First, there is a loss of energy in a course of driving power transmission because the driving power is transmitted from the motor 5a to the drum 3, not directly, but through the belt 20 wound around the motor pulley 18 and the drum pulley 19.

And, the driving power transmission from the motor 5a to the drum 3, not directly, but through many components, such as the belt 20, the motor pulley 18, and the drum pulley 19, causes much noise in the course of power transmission.

The lots of components required for transmission of driving power from the motor 5a to the drum 3, such as the motor pulley 18, the drum pulley 19 and the belt 20, require many assembly man-hours. And, the more the number of components required for transmission of driving power from the motor 5a to the drum 3, the more number of spots which require repair, and the more frequent at which repair required.

In summary, the indirect driving power transmission from the motor 5a to the drum 3 through the motor pulley, the drum pulley, and the belt requires many repair, has much noise, waste of energy, and results in a deterioration of a washing capability.

Moreover, the tub 2 of stainless steel in general in the related art drum washing machine is expensive, has a poor formability, and is heavy.

SUMMARY OF THE INVENTION

Accordingly, the present invention is directed to a structure of a driving unit in a drum type washing machine that substantially obviates one or more of the problems due to limitations and disadvantages of the related art.

An object of the present invention is to provide a structure of driving unit in a drum type washing machine, which can reduce noise. repair and waste of energy, and moreover, improve washing capability.

Another object of the present invention is to provide a structure of driving unit in a drum type washing machine, which has an improved supporting force.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the structure of a driving unit in a drum type washing machine having a tub mounted in a cabinet, a drum mounted in the tub, a shaft fixed to the drum for transmission of driving power from the motor to the drum, and bearings mounted on an outer circumference of the shaft at opposite end portions thereof, includes a metallic bearing housing at a central portion of a rear wall of the tub for supporting the bearings mounted on the outer circumferences of opposite end portions of the shaft.

In other aspect of the present invention, there is provided a structure of driving unit in a drum type washing machine including a tub mounted inside of a cabinet, a bearing housing built in a central portion of a rear wall of the tub for supporting a bearing therein, a shaft connected to a drum mounted inside of the tub for transmission of a driving force from a motor to the drum, bearings mounted on an outer circumference of the shaft at opposite end portions thereof respectively, a rotor coupled to a rear end of the shaft, a stator provided inward of the rotor fixed to the tub rear wall, a connector provided between the shaft and the rotor for transmission of a rotating force from the rotor to the shaft for rotating the shaft and the rotor together, and a supporter fitted between the rear wall of the tub and the stator for supporting the stator and maintaining a concentricity when the stator is mounted to the tub rear wall.

In another aspect of the present invention, there is provided a structure of driving unit in a drum type washing machine including a tub of plastic mounted inside of a cabinet, a metallic bearing housing inserted and built in a central portion of a rear wall of the tub having steps of "]" and "⌊" forms on an inner circumference for supporting bearings therein, a shaft connected to a drum mounted inside of the tub for transmission of a driving power from a motor to the drum, having a front end portion fixed to a spider in the drum rear wall, a brass bushing press fit on a region of the shaft from a portion exposed in rear of the spider to the front bearing for prevention of rusting of the shaft, and steps on an outer circumference thereof for fixing mounting positions of the front bearing and the rear bearing on the shaft, bearings mounted on the outer circumference of the shaft at opposite end portions thereof respectively, a rotor of steel or steel alloy plate coupled to the rear end portion of the shaft, including a bent portion formed along a circumference thereof having a setting surface for supporting magnets fitted to an inside of a front portion of a sidewall extended forward from a periphery of a rear wall, and a hub at a center of the rear wall having a through hole for a fastening member, such as a bolt, for coupling the rotor to the shaft, a plurality of cooling fins formed around the hub in a radial direction each with a length for blowing air toward the stator when the rotor is rotated for cooling down a heat generated at the stator, an embossing between adjacent cooling fins on the rear wall of the rotor for reinforcing the rotor, and a drain hole in each of the embossings, for drain of water, a stator composing the motor together with the rotor, fixed to the tub rear wall inward of the rotor, a connector of plastic provided between the shaft and the rotor for transmission of a rotating force from the rotor to the shaft for rotating the shaft and the rotor together, and a supporter fitted between the rear wall of the tub and the stator for supporting the stator and maintaining a concentricity when the stator is mounted to the tub rear wall.

In further aspect of the present invention, there is provided a structure of driving unit in a drum type washing machine including a tub mounted inside of a cabinet, a drum mounted inside of the tub, a shaft connected to the drum mounted inside of the tub for transmission of a driving force from a motor to the drum, a front bearing and a rear bearing mounted on an outer circumference of the shaft at opposite end portions thereof respectively, a bearing housing built in a central portion of a rear wall of the tub for supporting the front bearing, a rotor composing the motor together with the rotor, and coupled to the rear end portion of the shaft, a stator fixed to the tub rear wall inward of the rotor to compose the motor together with the rotor, a connector serration coupled to the outer circumference of the shaft in front of the rear bearing and fixed to the rotor, for transmission of a rotating power from the rotor to the shaft, and a bearing bracket fixed to the rear wall of the tub to cover an outside of the rotor and support the rear bearing.

In a still further aspect of the present invention, there is provided a structure of driving unit in a drum type washing machine including a tub of plastic mounted inside of a cabinet, a metallic bearing housing inserted to built in a central portion of a rear wall of the tub having steps on an inner circumference for supporting bearings therein, a shaft connected to a drum mounted inside of the tub for transmission of a driving power from a motor to the drum, having a front end portion fixed to a spider in the drum rear wall, and a brass bushing press fit on a region of the shaft from a portion exposed in rear of the spider to the front bearing for prevention of rusting of the shaft, bearings mounted on the outer circumference of the shaft at opposite end portions thereof respectively, a rotor of steel or steel alloy plate coupled to the rear end portion of the shaft, including a bent portion formed along a circumference thereof having a setting surface for supporting magnets fitted to an inside of a front portion of a sidewall extended forward from a periphery of a rear wall, and a hub at a center of the rear wall having a through hole for a fastening member, such as a bolt, for coupling the rotor to the shaft, a plurality of cooling fins formed around the hub in a radial direction each with a length for blowing air toward the stator when the rotor is rotated for cooling down a heat generated at the stator, an embossing between adjacent cooling fins on the rear wall of the rotor for reinforcing the rotor, and a drain hole in each of the embossings, for drain of water, a stator composing the motor together with the rotor, fixed to the tub rear wall inward of the rotor, a connector of plastic provided between the shaft and the rotor for transmission of a rotating force from the rotor to the shaft for rotating the shaft and the rotor together, a supporter fitted between the rear wall of the tub and the stator for supporting the stator and maintaining a concentricity when the stator is mounted to the tub rear wall, and a bearing bracket fixed to the rear wall of the tub to cover an outside of the rotor and support the rear bearing.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
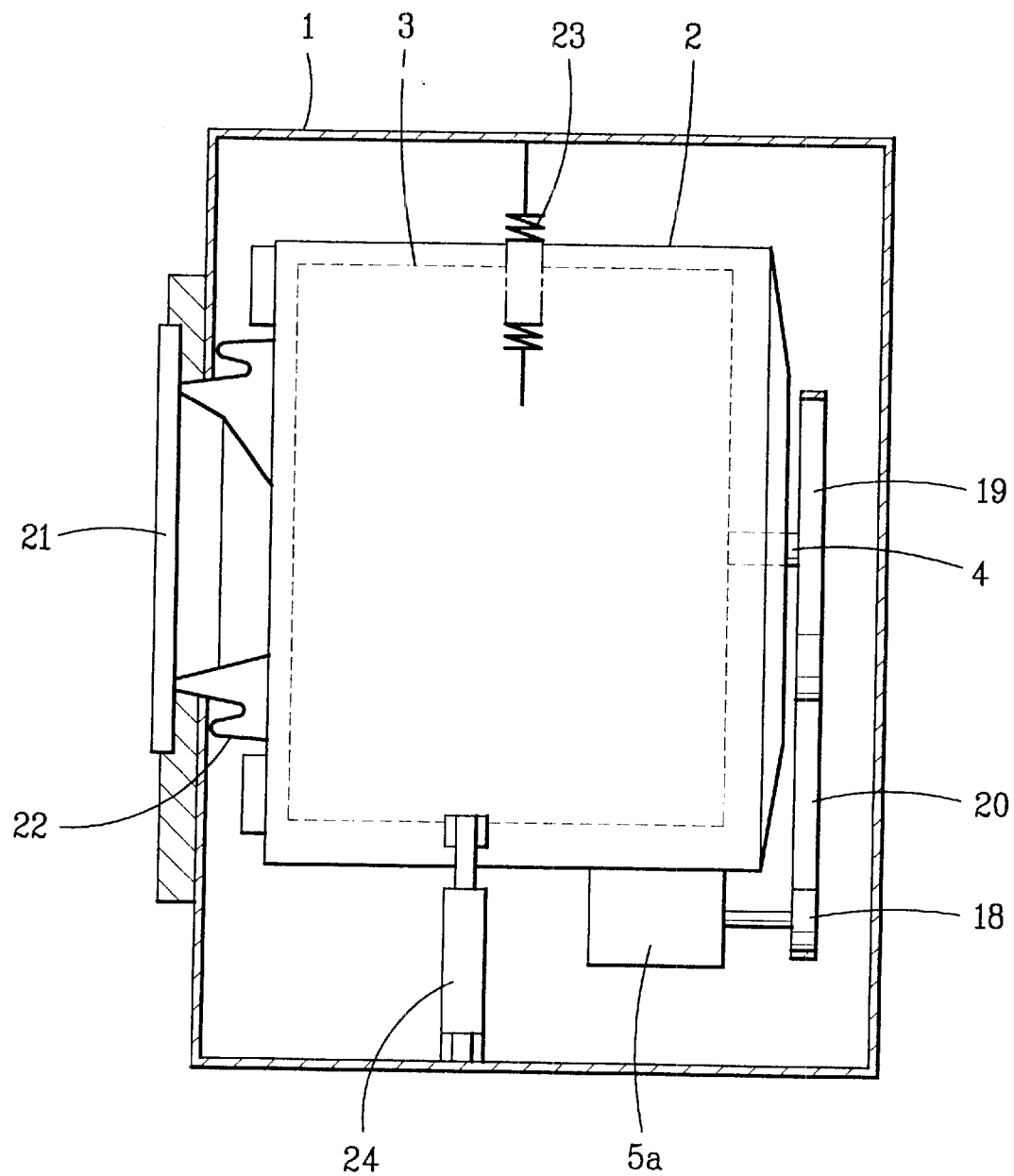
FIG. 1 illustrates a longitudinal section of a related art drum type washing machine.
Figure 2A:
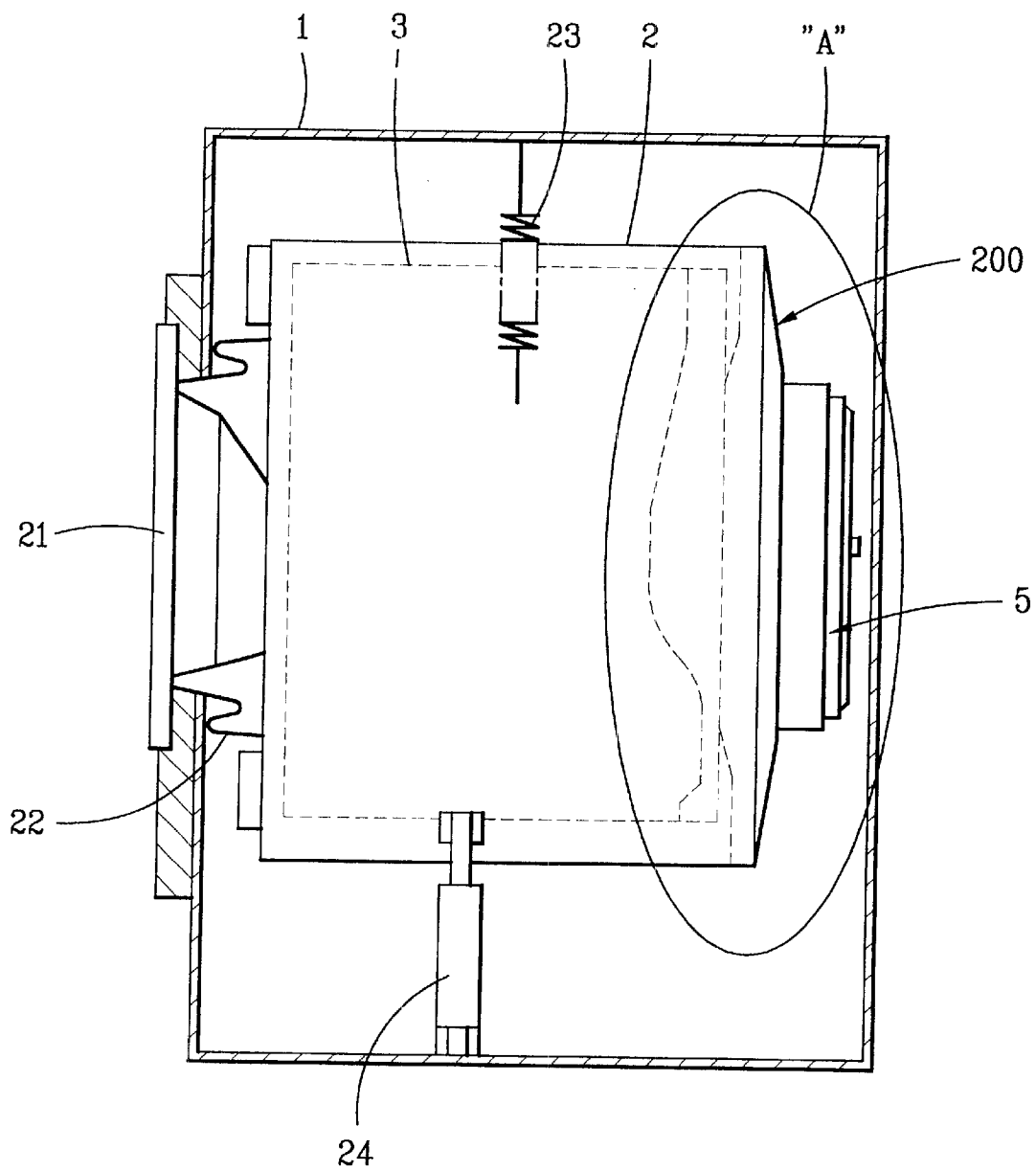
FIG. 2A illustrates a longitudinal section of a drum type washing machine in accordance with a first preferred embodiment of the present invention.
Figure 2B:
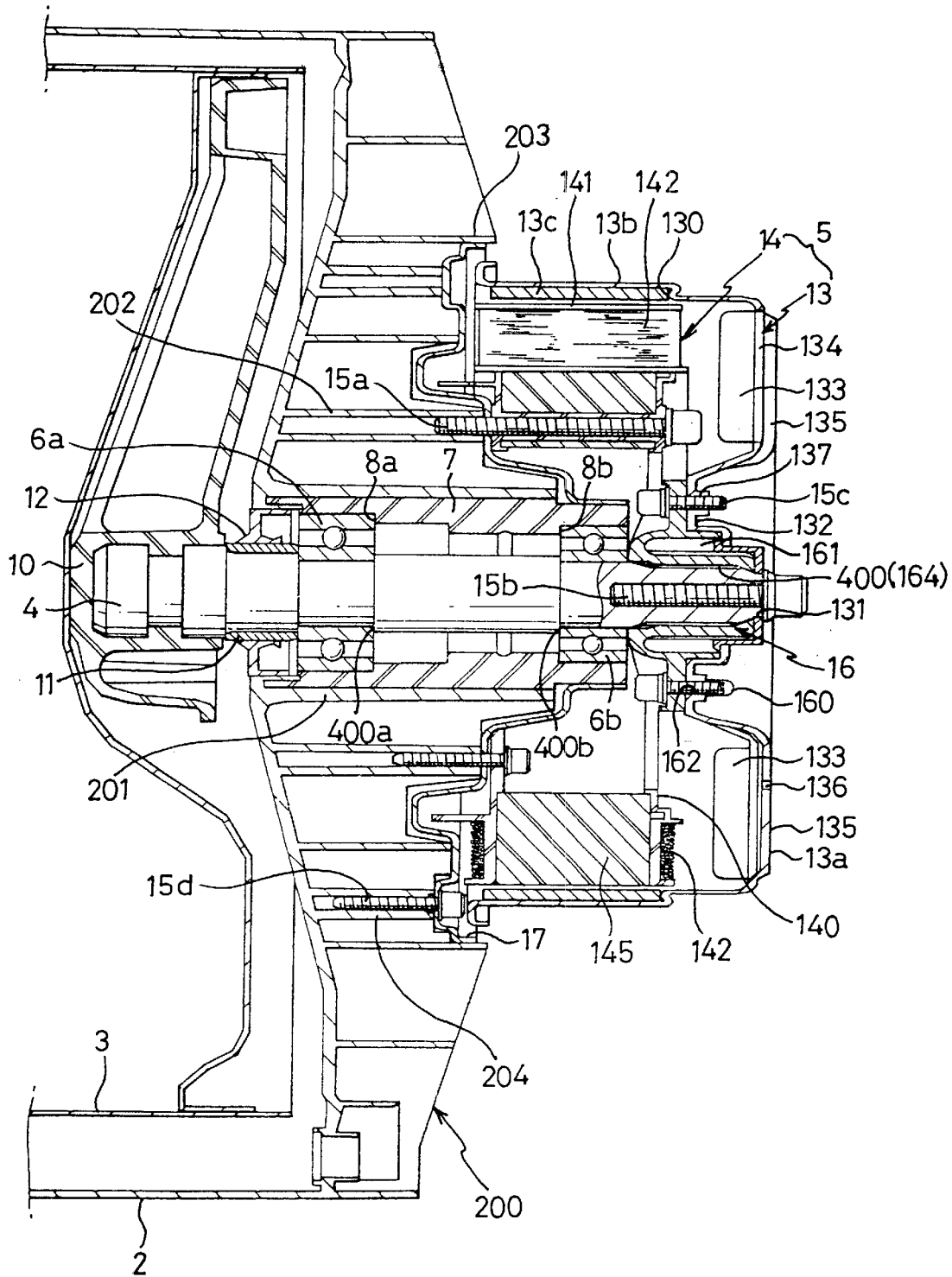
FIG. 2B illustrates a detailed enlarged view of "A" part in FIG. 2A.
Figure 6:
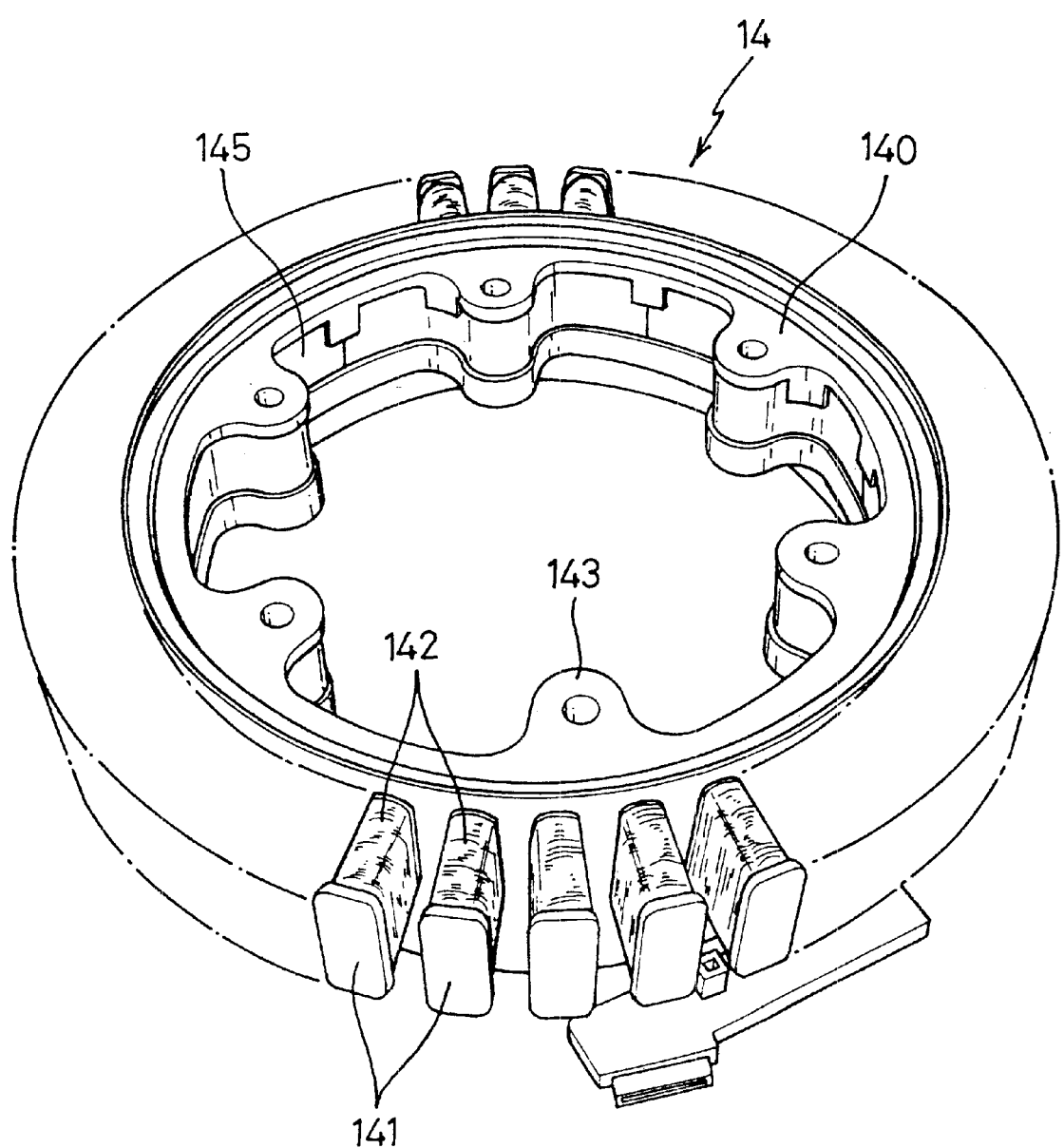
FIG. 6 illustrates a perspective view of the stator in FIG. 2.
Figure 7:
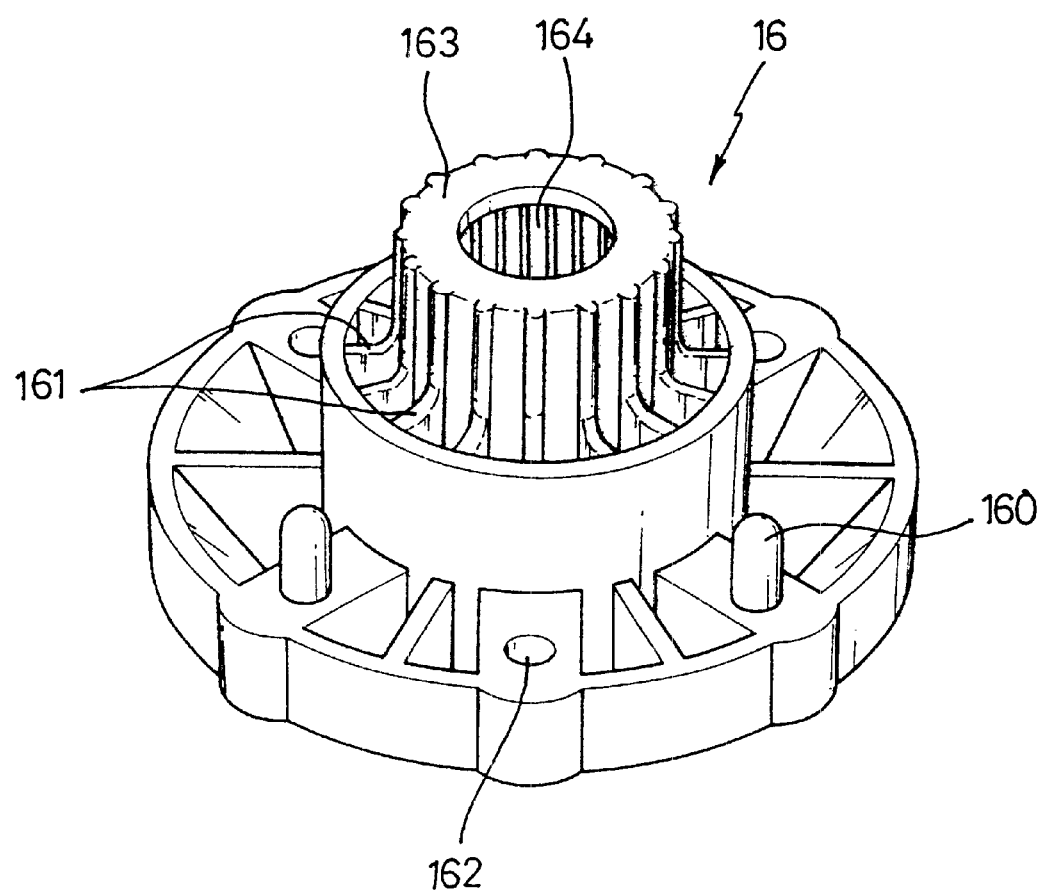
FIG. 7 illustrates a perspective view of the connector in FIG. 2.
Figure 8:
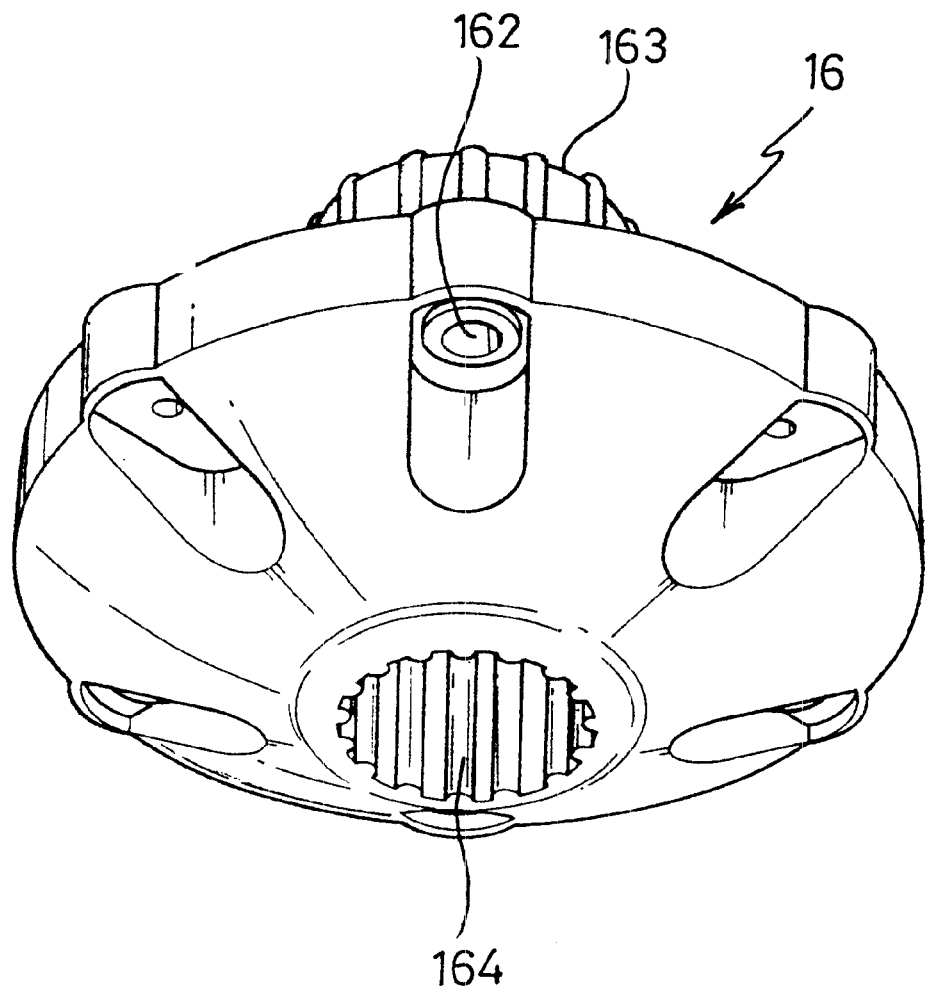
FIG. 8 illustrates a perspective view of a bottom in FIG. 7.

Reference will now be made in detail to the preferred embodiments of the present invention, examples of which are illustrated in the accompanying drawings. A first preferred embodiment of the present invention will be explained in detail with reference to FIGS. 2A~8. FIG. 2A illustrates a longitudinal section of a drum type washing machine in accordance with a first preferred embodiment of the present invention, FIG. 2B illustrates a detailed enlarged view of "A" part in FIG. 2A, FIG. 3 illustrates a perspective view with a partial cut away view of the rotor in FIG. 2, FIG. 4 illustrates an enlarged perspective view of "B" part in FIG. 3, FIG. 5 illustrates a perspective view of a bottom in FIG. 3, FIG. 6 illustrates a perspective view of the stator in FIG. 2, FIG. 7 illustrates a perspective view of the connector in FIG. 2, and FIG. 8 illustrates a perspective view of a bottom in FIG. 7.

The drum type washing machine in accordance with a first preferred embodiment of the present invention includes a tub 2 of plastic mounted inside of the cabinet 1, a drum 3 mounted in the tub 2, a shaft 4 fixed to the drum 3 for transmission of driving power from a motor 5 to the drum 3, bearings 6a and 6b fitted on outer circumference of the shaft 4 at both ends thereof, and bearing housings 7 of metal fitted to support the bearings 6a and 6b at a central portion of a rear wall 200 of the tub 2. The bearing housing 7 of metal is formed as a unit with the tub rear wall 200 by an inserted injection molding in the injection molding of the tub 2 of plastic. The bearing housing 7 is preferably formed of aluminum. The bearing housing 7 has steps 8a and 8b for holding the front bearing 6a and the rear bearing 6b fitted in inner circumferences of the bearing housing 7 for preventing the bearings 6a and 6b from being fallen off. Of the steps 8a and 8b formed on the inner circumferences of the bearing housing 7, the front step 8a has a form of "]" for supporting a rear end portion of the front bearing 6a fitted to a front end of an outer circumference of the shaft 4, and the rear step 8b has a form of "⌊" for supporting a front end portion of the rear bearing 6b fitted to a rear end portion of the shaft 4. And, there are positioning steps 400a and 400b on outer circumferences of the shaft 4 disposed inside of the bearing housing 7 which transmits driving power from the motor 5 to the drum 3, for fixing mounting positions of the front bearing 6a and the rear bearing 6b on the shaft 4. A front end of the shaft 4 is coupled to a spider 10 in a rear wall of the drum 3, a region of the shaft 4 from a portion exposed in rear of the spider 10 to the front bearing 6a has a bushing 11 of brass press fit thereon for prevention of rusting, and there is a sealing member 12 on an outer surface of the bushing 11 for preventing ingress of water toward the bearing. There is a rotor 13 of a direct coupling type motor 5 fixed to a center of a rear end of the shaft 4, and a stator 14 of a crown form, consisting the direct coupling type motor 5 together with the rotor 13, fixed to the rear wall 200 inside of the rotor 13.

Figure 3:
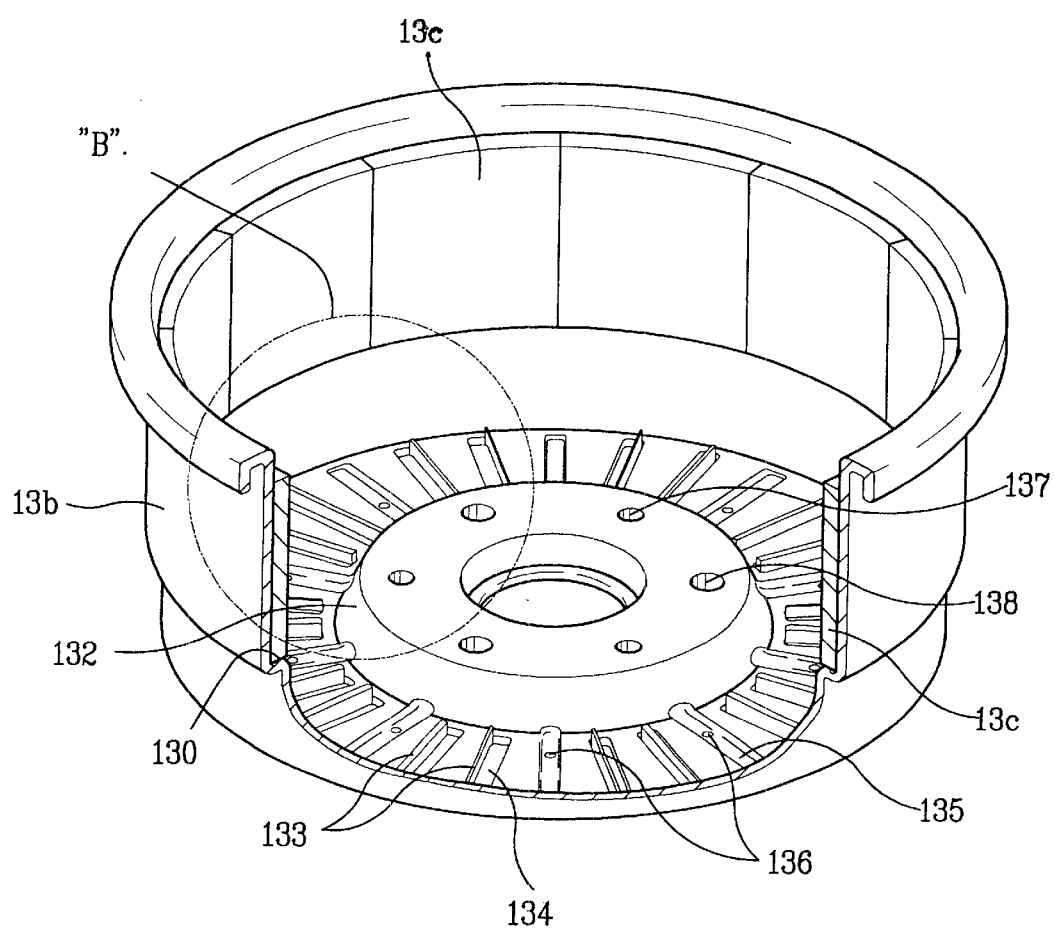
FIG. 3 illustrates a perspective view with a partial cut away view of the rotor in FIG. 2.
Figure 4:
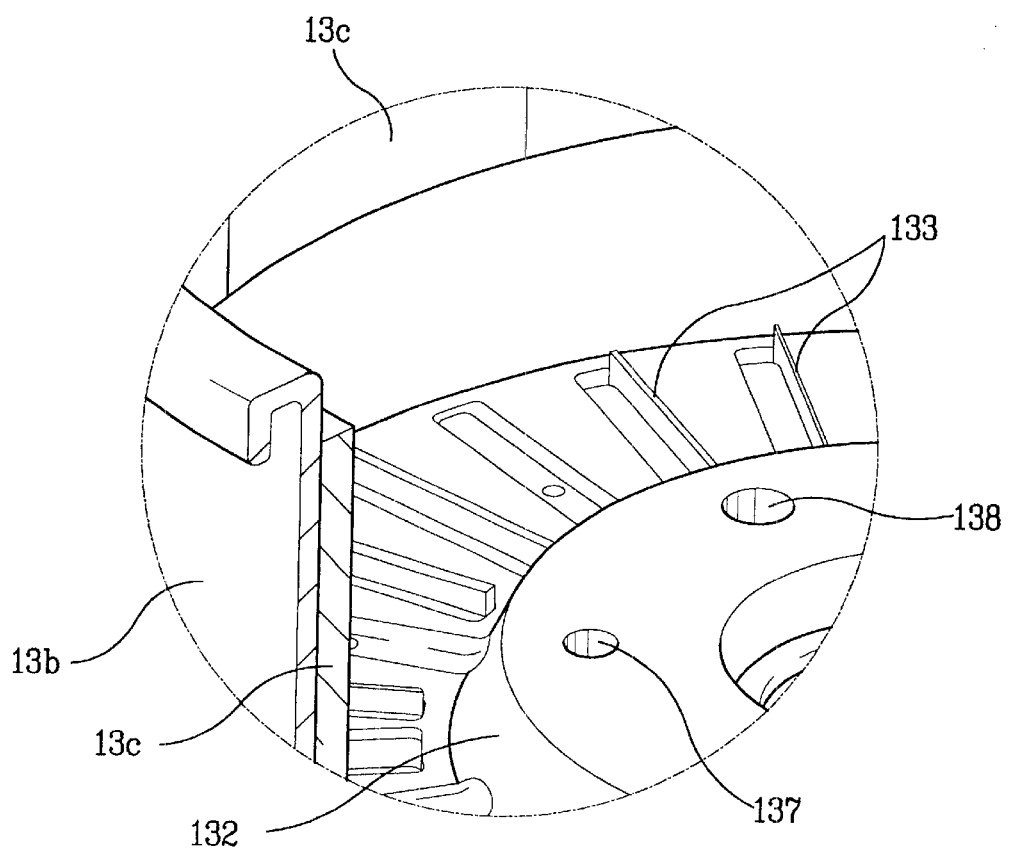
FIG. 4 illustrates an enlarged perspective view of "B" part in FIG. 3.
Figure 5:
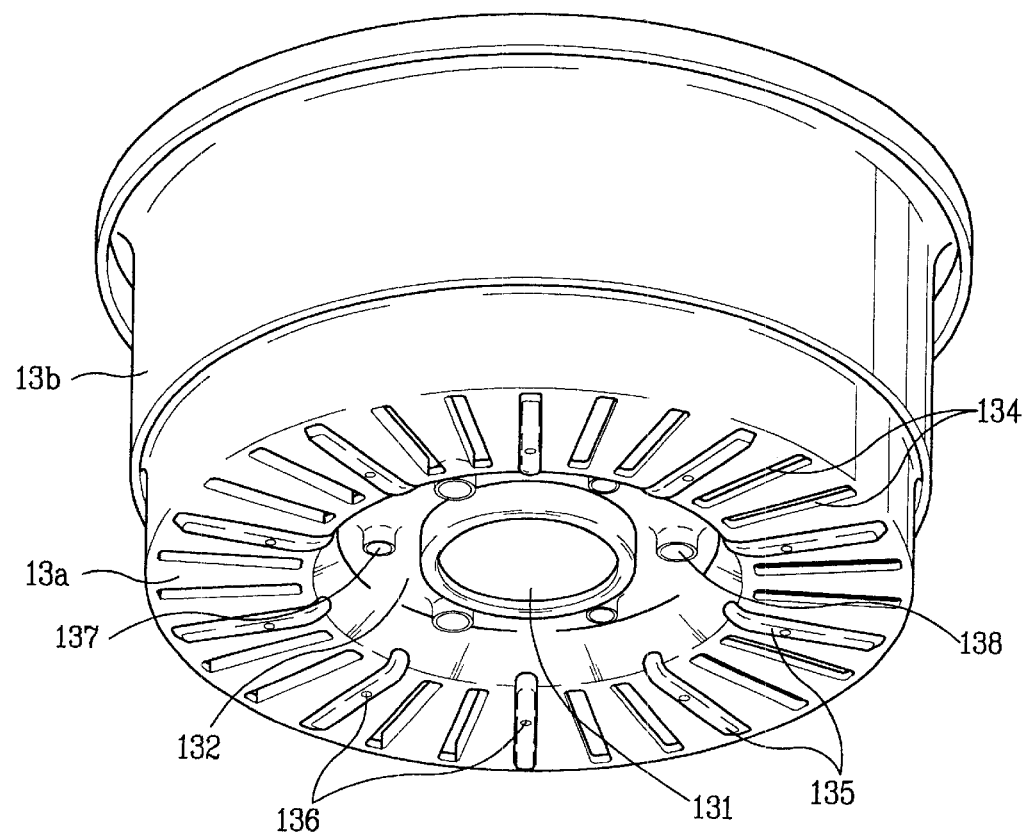
FIG. 5 illustrates a perspective view of a bottom in FIG. 3.

Referring to FIGS. 3~5, the rotor 13 of steel or steel alloy plate includes a bent portion formed along a circumference thereof having a setting surface 130 for supporting magnets 13c fitted to an inside of front of a sidewall 13b extended forward from a periphery of a rear wall 13a, and a hub 132 at a center of the rear wall 13a having a through hole 131 for fastening members 15a, such as bolts, for coupling the rotor 13 to the shaft 4. An overall form of the rotor 13 is preferably formed by press forming. There are a plurality of cooling fins 133 each formed to have a preset length in a radial direction around the hub 132 of the rotor 13 for blowing air toward the stator 14 during rotation of the rotor 13 for cooling heat generated at the stator 14. The cooling fins 133 are formed by lancing, to bend the cooling fins 133 at a right angle to the rear wall toward the opening to leave through holes 134 for ventilation. There is an embossing 135 between adjacent cooling fins 133 with a drain hole 136 therein for draining water. There are fastening holes 137 for fastening a connector 16 to the rotor 13 and positioning holes 138 for positioning an assembly position of the connector 16 around the through hole 131 in the hub 132 of the rotor 13 at fixed intervals, which connector 16 is serration coupled to an outer circumference of a rear end portion of the shaft 4 exposed to rear of the rear bearing 6b. The connector 16 is formed of resin having a vibration mode different from the rotor 13 of steel or steel alloy plate, and also serves as a bushing for the rotor 13. As shown in FIGS. 2B, 7 and 8, the connector 16 has fastening holes 162 to correspond to the fastening holes 137 in the hub 132 of the rotor 13 around a circumferential direction of the a peripheral region and a dowel pin 160 between adjacent fastening holes 162 as a unit with the connector 16 for insertion in the positioning hole 138 in the rotor 13 for self alignment of the fastening holes 137 and 162 in the rotor 13 and the connector 16, respectively. The connector 16 has a serration in an inside circumference of the hub 163 matched to the serration in the rear end of the shaft 4, and reinforcing ribs 161 on outer circumference of the hub 163 for reinforcing the hub 163. There is a hub 201 on the rear wall 200 of the tub 2 having the bearing housing 7 inserted therein when the tub is injection molded, and fastening bosses 202 on an outer side of the hub 201 along a circumferential direction at fixed intervals for fastening the stator 14 to the rear wall 200 of the tub 2. There is a supporter 17 between the rear wall 200 of the tub 2 and the stator 14, of a form almost identical to an outline of the tub rear wall 200, fixed to the tub rear wall 200 when the stator 14 is assembled for supporting the stator 14 and maintaining concentricity of the stator 14. The supporter 17 has a fore end brought into a close contact with an inside of ribs 203 at one side of the tub rear wall 200, and a rear end brought into a close contact with an outer circumference of a rear end of the bearing housing 7 which is not enclosed by the hub 132, but exposed. In the meantime, as shown in FIGS. 2B and 6, the stator 14 includes a magnetic core 145 of segregated layers of magnetic material, a frame 140 of resin coated on the magnetic core 145, a coil 142 wound around each of winding parts 141 on an outer circumference of the frame 140, and fastening ribs 143 on an inside of the frame 140 for fastening the stator 14 to the tub rear wall 200.

The operation of the driving unit in a drum type washing machine in accordance with a first preferred embodiment of the present invention will be explained. Upon causing rotation of the rotor 13 by making a current to flow to the coils 142 of the stator 14 in a sequence under the control of a motor driving controller(not shown) fitted on a panel, the shaft 4 serration coupled with the connector 16 fixed to the rotor is rotated, together with the drum 3 as the power is transmitted to the drum 3 through the shaft 4.

In the meantime, the drum type washing machine having the driving unit of the present invention applied thereto serves as follows. The tub 2 of the drum type washing machine of the present invention, formed of a plastic with an excellent heat resistance, is light and has a good formability as the tub 2 is injection molded. Since the bearing housing 7 in the drum type washing machine of the present invention is formed of a metal, such as aluminum and the like, the bearing housing 7 is applicable to a drum type washing machine having a drying cycle as the bearing housing shows no thermal deformation. And, since the metallic bearing housing 7 of the present invention is formed integrated with the tub 2 by inserting the bearing housing 7 in the hub 201 on the tub rear wall 200 before the tub 2 of plastic is injection molded, a separate step for assembling the bearing housing 7 to the tub rear wall 200 can be omitted, which simplifies an assembly process, that reduces assembly man-hours. The "]" form of the step 8a in a front portion of an inner circumference of the bearing housing 7 and the "⌊" form of the step 8b in a rear portion of an inner circumference of the bearing housing 7 permit to support a rear end of the front bearing 6a and a fore end of the rear bearing 6b mounted on outer circumference of the shaft 4 at both end portions thereof. That is, the steps 8a and 8b on inner circumferences of the metallic bearing housing 7 on both sides thereof prevent both bearings 6a and 6b from being fallen off the bearing housing 7. The positioning steps 400a and 400b on outer circumferences of the shaft 4 at front and rear portions thereof permit easy positioning of the front bearing 6a and the rear bearing 6b on the shaft 4 in the assembly. The front end portion of the shaft 4 is coupled to the spider 10 in the rear wall, and the brass bushing 11 press fit to the region from the exposed portion outside of the spider 10 of the shaft 4 to the front bearing 6a prevents rusting of the shaft 4. The sealing member 12 outside of the bushing 11 prevents ingress of water toward the bearing.

In the meantime, the rotor 13 of the direct coupling type motor 5 is mounted on a center of the rear end portion of the shaft 4, with the stator 14 disposed on inner side of the rotor, wherein the bend part having the magnet setting surface 130 is formed along a circumferential direction of the sidewall 13b extended forward from a periphery of the rear wall 13a of the rotor 13, for supporting the magnets 13c when the magnets 13c are fitted to an inside surface of the rotor 13, to fabricate the rotor with easy. The through hole 131 of the hub 132 at a center of the rear wall 13a of the rotor 13 permits the fastening member 15b, such as a bolt or the like, to pass therethrough for fastening the rotor 13 to the shaft 4, and the plurality of cooling fins 133 around the hub 132 of the rotor 13 in a radial direction with a length blow air toward the stator 14 during rotation of the rotor 13 for cooling down a heat generated at the stator 14. The cooling fins 133 are formed by lancing, to direct toward the opening of the rotor 13, and to leave through holes 134 for ventilation. The rotor 13 of steel or steel alloy plate is formed by pressing, which shortens a fabrication time period, that improves a productivity. The embossing 135 between the adjacent cooling fins 133 of the rear wall 13a of the rotor 13 improves an overall strength of the rotor 13, and the drain hole 136 in the embossing 135 drains water.

In the meantime, the fastening holes 137 for fastening the connector and the positioning holes 138 for fixing an assembly position of the connector 16 around the through hole 131 in the hub 132 of the rotor 13 permits an easy assembly of the connector 16 to the rotor, which connector 16 is serration coupled to the outer circumference of the rear end portion of the shaft 4 exposed to rear of the rear bearing 6b. That is, once the dowel pins 160 on the connector 16 are inserted in the positioning holes 138 in the rotor 13, the fastening holes 137 and 162 in the rotor 13 and the connector 16 are matched automatically, and by fastening the fastening members 15c through the fastening holes 137 and 162 in the rotor 13 and the connector 16, the connector 16 and the rotor 13 can be assembled with easy. The connector 16 serves to damp vibration from the rotor 13 to the shaft 4 as the connector 16 injection molded of a resin has a different vibration mode from the rotor 13 of steel or steel alloy plate. The serration 164 in the inner circumference of the hub 163 of the connector 16 is fit to the serration 400 in the rear end portion of the shaft 4, to transmit the rotating force of the rotor 13 to the shaft, directly. The reinforcing ribs 161 on an outer circumference of the hub 163 of the connector 16 reinforce the hub 163.

In the meantime, the fastening bosses 202 along a circumference on an outer side of the hub 201 on the rear wall 200 of the tub 2 at fixed intervals permits to fix the stator 14 to the rear wall 200 of the tub 2 by using the fastening boss 202. The supporter 17 between the rear wall 200 of the tub 2 and the stator 14 having a form almost identical to the outline of the rear wall 200 for being fixed to the rear wall 200 of the tub 2 when the stator 14 is fastened permits the stator 14 being supported and maintained of concentricity. That is, once the supporter 17 is fastened to the fastening bosses 204 on the tub rear wall 200, the fore end of the supporter 17 is brought into close contact with an inside surface of the ribs 203 at one side of the tub rear wall 200 and the rear end of the supporter 17 is brought into close contact with the outer circumference of the rear end portion of the bearing housing 7 at a central portion of the tub rear wall 200, which can not be enclosed, but exposed, by the hub 132, such that the supporter 17 supports the stator 14 as well as maintains a concentricity of the stator 14.

The structure of a driving unit in a drum type washing machine in accordance with a first preferred embodiment of the present invention has the following advantages.

The motor direct coupling structure of the drum type washing machine in accordance with a first preferred embodiment of the present invention permits to reduce repair, and power loss.

The bearing housing of metal in the drum type washing machine in accordance with a first preferred embodiment of the present invention shows no thermal deformation, that allows to apply to a product having a drying function.

The rotor of steel or steel alloy plate formed by pressing in the drum type washing machine in accordance with a first preferred embodiment of the present invention requires a very short fabrication time period, with an improved productivity, because the steel or steel alloy plate pressing has an excellent formability.

And, the magnet setting surface on the rotor of the present invention improves a workability in fitting the magnets, and the drain holes, the cooling fins, and the through holes provided to the rotor can prevent overheating of the motor, improve a reliability of the motor, and prolong a lifetime of the motor.

And, the connector having a vibration mode different from the rotor in the drum type washing machine of the present invention can attenuate the vibration transmitted from the rotor to the shaft, and the supporter can support the stator and maintain a concentricity of the stator.

Figure 9:
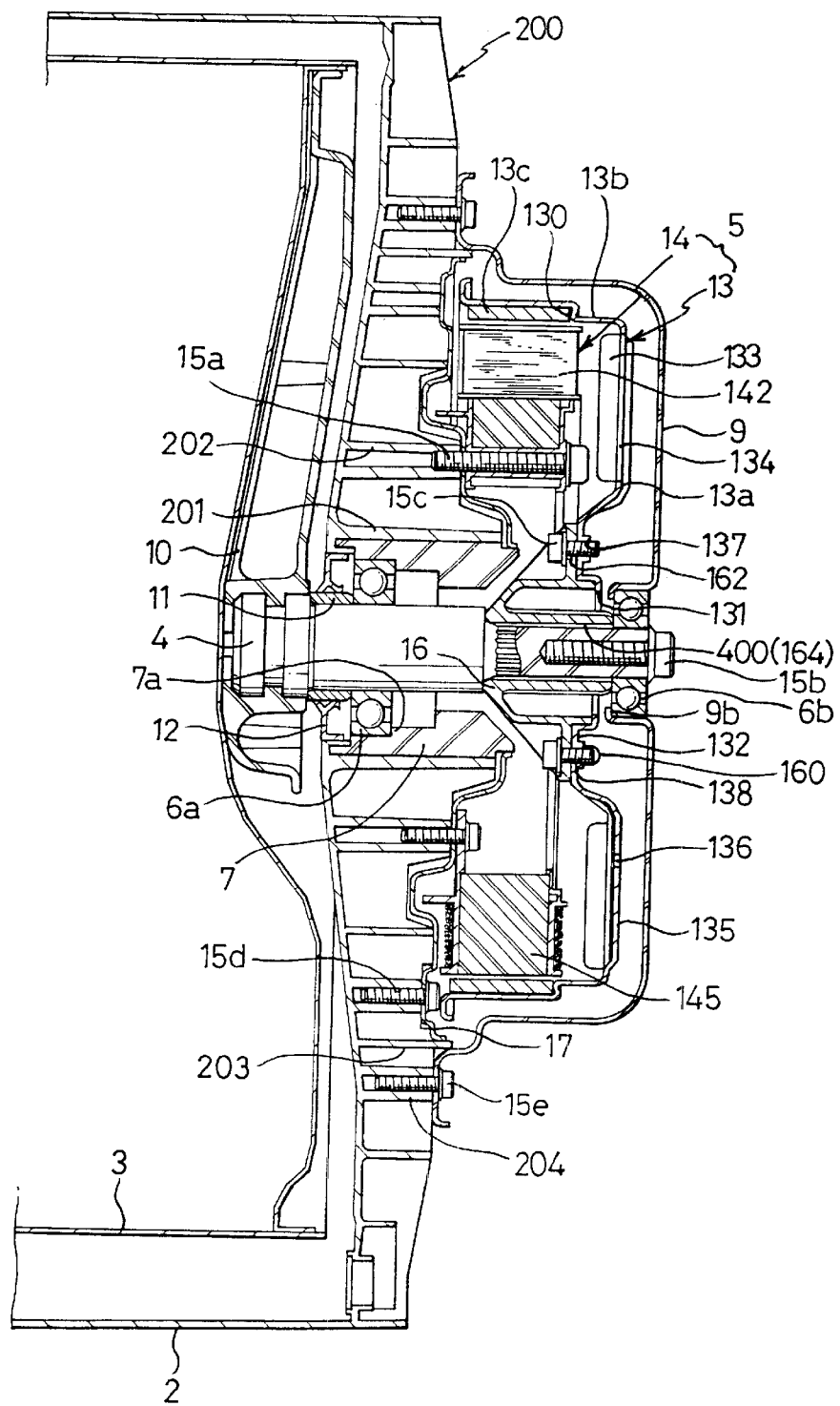
FIG. 9 illustrates a longitudinal section of a driving unit in a drum type washing machine in accordance with a second preferred embodiment of the present invention.

A driving unit in a drum type washing machine in accordance with a second preferred embodiment of the present invention will be explained with reference to FIGS. 3~9, in detail. FIG. 9 illustrates a longitudinal section of a driving unit in a drum type washing machine in accordance with a second preferred embodiment of the present invention. The rotor, the stator and the connector in the second preferred embodiment of the present invention are identical to those of the first embodiment, to which the same names and reference symbols are given, and will be explained with reference to FIGS. 3~8.

The drum type washing machine in accordance with a second preferred embodiment of the present invention includes a tub 2 mounted inside of a cabinet 1, a drum 3 mounted inside of the tub 2, a shaft 4 connected to the drum mounted inside of the tub 3 for transmission of a driving force from the motor 5 to the drum, a front bearing 6a and a rear bearing 6b mounted on outer circumferences of the shaft 4 at both end portions thereof respectively, a bearing housing 7 built in a central portion of the rear wall 200 of the tub 3 for supporting the front bearing 6a, a rotor 13 coupled to the shaft 4, a stator 14 provided inward of the rotor 13 coupled to the tub rear wall 200, a connector 16 serration coupled to an outer circumference of the shaft 4 in front of the rear bearing 6b and fixed to the rotor 13 for transmission of a rotating force of the rotor 13 to the shaft 4, a supporter 17 fitted between the rear wall 200 of the tub 2 and the stator 14 for supporting the stator and maintaining a concentricity when the stator is mounted to the tub rear wall 200, and a bearing bracket 9 fixed to the tub rear wall 200 for covering outside of the rotor 13 and supporting the front end portion of the rear bearing 6b. The tub 2 is formed of plastic, and has an opened front and a closed rear wall 200 of which thickness is greater than a thickness of a sidewall, and the bearing housing 7 at the central portion of the rear wall 200 of the tub 2 is formed of a metal, wherein the bearing housing 7 is insert injection molded when the plastic tub 2 is injection molded, such that the bearing housing 7 is integrated with the tub rear wall 200. The bearing housing 7 is preferably formed of an aluminum alloy.

In the meantime, there is a step 7a on an inner circumference of the metallic bearing housing 7 for supporting the front bearing 6a to prevent the front bearing 7 from being fallen off the bearing housing 7. The step 7a on the inner circumference of the bearing housing 7 has a form of "]" for having a structure which supports a rear end portion of the front bearing 6a mounted on a front end portion of the shaft 4. The front end portion of the shaft 4 is fixed to a spider 10 in the rear wall 200 of the drum 3, a region of the shaft 4 from a portion exposed in rear of the spider 10 to the front bearing 6a has a bushing 11 of brass press fit thereon for prevention of rusting, and there is a scaling member 12 on an outer surface of the bushing 11 for preventing ingress of water toward the front bearing 6a. There connector 16 is serration coupled to the rear end portion of the shaft 4 for connection between the rotor 13 of the direct coupling type motor 5 and the shaft 4, the rotor 13 is fixed to the connector 16 with fastening members 15c, and the stator 14, forming the direct coupling type motor together with the rotor 13, is fixed to the rear wall 200 of the tub 2 inward of the rotor 13. As shown in FIGS. 3~5, the rotor 13 of steel or steel alloy plate includes a bend part having a magnet setting surface 130 formed along a circumferential direction of a sidewall 13b extended forward from a periphery of the rear wall 13a of the rotor 13, for supporting magnets 13c fitted to a front portion of an inside surface of the rotor 13, and a hub 132 having a through hole 131 at a center of the rear wall 13a of the rotor 13 so that a fastening member 15a, such as a bolt or the like, can pass through for coupling the rotor 13 to the shaft 4. An overall form of the rotor 13 is preferably formed by pressing. There are a plurality of cooling fins 133 each formed to have a preset length in a radial direction around the hub 132 of the rotor 13 for blowing air toward the stator 14 during rotation of the rotor 13 for cooling heat generated at the stator 14. The cooling fins 133 are formed by lancing, to bend the cooling fins 133 at a right angle to the rear wall 13a toward the opening to leave through holes 134 for ventilation. There is an embossing 135 between adjacent cooling fins 133 with a drain hole 136 therein for draining water. There are fastening holes 137 for fastening a connector 16 to the rotor 13 and positioning holes 138 for positioning an assembly position of the connector 16 around the through hole 131 in the hub 132 of the rotor 13 at fixed intervals, which connector 16 is serration coupled to an outer circumference of a rear end portion of the shaft 4 exposed in rear of the rear bearing 6b. The connector 16 is formed of resin having a vibration mode different from the rotor 13 of steel or steel alloy plate. As shown in FIGS. 7~9, the connector 16 has fastening holes 162 to correspond to the fastening holes 137 in the hub 132 of the rotor 13 around a circumferential direction of the a peripheral region and a dowel pin 160 between adjacent fastening holes 162 as a unit with the connector 16 for insertion in the positioning hole 138 in the rotor 13 for self alignment of the fastening holes 137 and 162 in the rotor 13 and the connector 16, respectively. The connector 16 has a serration in an inside circumference of the hub 163 matched to the serration in the rear end of the shaft 4, and reinforcing ribs 161 on outer circumference of the hub 163 for reinforcing the hub 163. There is a hub 201 on the rear wall 200 of the tub 2 having the bearing housing 7 inserted therein when the tub is injection molded, and fastening bosses 202 on an outer side of the hub 201 along a circumferential direction at fixed intervals for fastening the stator 14 to the rear wall 200 of the tub 2. There is a supporter 17 between the rear wall 200 of the tub 2 and the stator 14, of a form almost identical to an outline of the rear wall 200, fixed to the tub 2 rear wall 200 when the stator 14 is assembled for supporting the stator 14 and maintaining concentricity of the stator 14. Once the supporter 17 is fastened to the support fastening bosses 204, a fore end of the supporter 17 is brought into close contact with an inside of ribs 203 at one side of the tub rear wall 200, and a rear end thereof is brought into close contact with an outer circumference of a rear end of the bearing housing 7 which is not enclosed by the hub 132, but exposed, thereby the supporter 17 supporting the stator 14 and maintaining a concentricity of the stator. In the meantime, as shown in FIGS. 3 and 6, the stator 14 includes a ring formed frame 140, a coil 142 wound around each of winding parts 141 on an outer circumference of the frame 140, and fastening ribs 143 on an inside of the frame 140 for fastening the stator 14 to the tub rear wall 200.

In the meantime, referring to FIG. 9, there is an "⌊" formed step 900b at an inner end portion of the bearing bracket 9 fixed to the tub rear wall 200 to cover an outer side of the rotor 13. And, there is a rear bearing fixing member 15b at an rear end of the shaft 4 for supporting a rear surface of the shaft 4 to prevent the rear bearing from being fallen off the shaft 4.

The operation of the driving unit in a drum type washing machine in accordance with a second preferred embodiment of the present invention will be explained. Upon causing rotation of the rotor 13 by making a current to flow to the coils 142 of the stator 14 in a sequence under the control of a motor driving controller(not shown) fitted on a panel, the shaft 4 serration coupled with the connector 16 fixed to the rotor is rotated, together with the drum 3 as the power is transmitted to the drum 3 through the shaft 4.

In the meantime, the drum type washing machine in accordance with the second preferred embodiment of the present invention driven thus serves as follows. Alike the first embodiment of the present invention, since the tub 1 is formed of a plastic with an excellent heat resistance, the tub 1 is light and has a good formability as the tub 2 is injection molded. Since the bearing housing 7 is formed of a metal, such as an aluminum alloy and the like, the bearing housing 7 is applicable to a drum type washing machine having a drying cycle as the bearing housing shows no thermal deformation. And, since the metallic bearing housing 7 is formed integrated with the tub 2 by inserting the bearing housing 7 in the hub 201 on the tub rear wall 200 before the tub 2 of plastic is injection molded, a separate step for assembling the bearing housing 7 to the tub rear wall 200 can be omitted, which simplifies an assembly process, that reduces assembly man-hours. The step 7a in an inner circumference of a front portion of the bearing housing 7 in the second embodiment of the present invention supports a rear end of the front bearing 6a mounted on an outer circumference of the fore end portion of the shaft 4. That is, the "]" formed step 7a in a front portion of an inner circumference of the metallic bearing housing 7 of the present invention permits to support the front bearing 6a without being fallen off the bearing housing 7. And, the "⌊" formed step 900b in an end portion of an inner circumference of the metallic bearing bracket 9 covering an outer side of the rotor 13 fixed to the tub rear wall 200 permits to support a front end of the rear bearing 6b mounted on the rear end portion of the shaft 4, and the rear bearing fixing member 15b on the rear end surface of the shaft 4 prevents the rear bearing 6b from being fallen off the shaft 4.

In the meantime, in the second preferred embodiment of the present invention, since the front bearing 6a is mounted in the bearing housing 7 having insert injection molded in the tub 1. and the rear bearing 6b is mounted in an inside of a center portion of the bearing bracket 9, a distance between the front and rear bearings 6a and 6b on the shaft 4 becomes greater, between which the rotor is mounted. The greater distance between the front and rear bearings 6a and 6b permits to withstand a load caused by imbalance of laundry in the drum 1 during spinning better, and a supporting force to the rotor 13 is enhanced as the rotor 13 of the motor is mounted between the front and rear bearings 6a and 6b. Alike the first preferred embodiment of the present invention, in the second preferred embodiment of the present invention, the brass bushing 11 press fit to the region from the exposed portion outside of the spider 10 of the shaft 4 to the front bearing 6a prevents rusting of the shaft 4. And, alikely, the sealing member 12 outside of the bushing 11 prevents ingress of water toward the bearing.

Alike the first preferred embodiment, as shown in FIGS. 3 to 6, the bend part having the magnet setting surface 130 is formed along a circumferential direction of the sidewall 13b extended forward from a periphery of the rear wall 13a of the rotor 13, for supporting the magnets 13c when the magnets 13c are fitted to an inside surface of the rotor 13, to fabricate the rotor with easy. Alike the first preferred embodiment of the present invention, in the second preferred embodiment of the present invention, the plurality of cooling fins 133 around the hub 132 of the rotor 13 in a radial direction with a length blow air toward the stator 14 during rotation of the rotor 13 for cooling down a heat generated at the stator 14. The cooling fins 133 are formed by lancing to direct toward the opening of the rotor 13, and to leave through holes 134 for ventilation. Since the rotor 13 is formed of steel or steel alloy plate by pressing, which shortens a fabrication time period significantly, a productivity is improved. The embossing 135 between the adjacent cooling fins 133 of the rear wall 13a of the rotor 13 improves an overall strength of the rotor 13, and the drain hole 136 in the embossing 135 drains water.

In the meantime, the fastening holes 137 for fastening the connector and the positioning holes 138 for fixing an assembly position of the connector 16 around the through hole 131 in the hub 132 of the rotor 13 permits an easy assembly of the connector 16 to the rotor, which connector 16 is serration coupled to the outer circumference of the rear end portion of the shaft 4. That is, once the dowel pins 160 on the connector 16 are inserted in the positioning holes 138 in the rotor 13, the fastening holes 137 and 162 in the rotor 13 and the connector 16 are matched automatically, and by fastening the fastening members 15c through the fastening holes 137 and 162, the connector 16 and the rotor 13 can be assembled with easy. The connector 16 serves to damp vibration from the rotor 13 to the shaft 4 as the connector 16 injection molded of a resin has a different vibration mode from the rotor 13 of steel or steel alloy plate. The serration 164 in the inner circumference of the hub 163 of the connector 16 is fit to the serration 400 in the rear end portion of the shaft 4, to transmit the rotating force of the rotor 13 to the shaft, directly. The reinforcing ribs 161 on an outer circumference of the hub 163 of the connector 16 reinforce the hub 163.

In the meantime, the fastening bosses 202 along a circumference on an outer side of the hub 201 on the rear wall 200 of the tub 2 at fixed intervals permits to fix the stator 14 to the rear wall 200 of the tub 2 by using the fastening boss 202. The supporter 17 between the rear wall 200 of the tub 2 and the stator 14 having a form almost identical to the outline of the rear wall 200 for being fixed to the rear wall 200 of the tub 2 when the stator 14 is fastened permits the stator 14 being supported and maintained of concentricity. That is, the front end of the supporter 17 is brought into close contact with an inside surface of the ribs 203 at one side of the tub rear wall 200 and the rear end of the supporter 17 is brought into close contact with the outer circumference of the rear end portion of the bearing housing 7 at a central portion of the tub rear wall 200, which can not be enclosed, but exposed, by the hub 132, such that the supporter 17 supports the stator 14 as well as maintains a concentricity of the stator 14.

The structure of a driving unit in a drum type washing machine in accordance with a second preferred embodiment of the present invention has the following advantages.

The motor direct coupling structure of the drum type washing machine of the present invention permits to reduce repair, noise and power loss.

The bearing housing of metal in the drum type washing machine of the present invention shows no thermal deformation, that allows to apply to a product having a drying function.

The rotor of steel or steel alloy plate formed by pressing in the drum type washing machine of the present invention requires a very short fabrication time period, with an improved productivity, because the steel or steel alloy plate pressing has an excellent formability.

And, the magnet setting surface on the rotor of the present invention improves a workability in fitting the magnets, and the drain holes, the cooling fins, and the through holes provided to the rotor can prevent overheating of the motor, improve a reliability of the motor, and prolong a lifetime of the motor.

And, the connector having a vibration mode different from the rotor in the drum type washing machine of the present invention can attenuate the vibration transmitted from the rotor to the shaft, and the supporter can support the stator and maintain a concentricity of the stator.

Particularly, in the second preferred embodiment of the present invention, the greater distance between the front and rear bearings permits to withstand a load caused by imbalance of laundry in the drum 1 during spinning better, and a supporting capability to the rotor is enhanced as the rotor of the motor is mounted between the front and rear bearings.

Thus, by improving a structure of a driving unit of a drum type washing machine, the present invention can reduce noise, repair and power loss, by improving a washing capability, can improve a product reliability, and, by improving workability in fabrication of components of the driving unit, can improve a productivity.

It will be apparent to those skilled in the art that various modifications and variations can be made in the structure of a driving unit in a drum type washing machine of the present invention without departing from the spirit or scope of the invention. Thus, it is intended that the present invention cover the modifications and variations of this invention provided they come within the scope of the appended claims and their equivalents.

What is claimed is:

1. A driving unit in a drum type washing machine comprising:
    a tub comprising plastic and including an opened front, a closed rear wall, and a sidewall extending from a periphery of the rear wall to the opened front, wherein the tub is cylindrical;
    a drum mounted rotatably in the tub;
    a bearing housing comprising metal, and including a cylindrical aperture therethrough defining an inner circumference, wherein the bearing housing is mounted proximate to a central portion of the rear wall of the tub by insert injection molding;
    a shaft passing through the bearing housing, the shaft having one end connected to the drum;

at least one bearing mounted between the shaft and the bearing housing for supporting the shaft;

a stator fixed at a central portion of the rear wall of the tub, the stator including a magnetic core having a stack of layers of magnetic material and a winding part having a coil wound thereon for forming a magnetic force; and a rotor comprising a sidewall, a rear wall and a permanent magnet fixed to the sidewall of the rotor, wherein the rotor is coupled to the shaft.

2. A structure as claimed in claim 1, wherein the metal bearing housing is formed of an alloy of aluminum.

3. A driving unit as claimed in claim 1, wherein the at least one bearing comprises a front bearing and a rear bearing, and wherein the bearing housing has steps formed on front and rear portions of the inner circumference thereof for supporting the front bearing and the rear bearing, wherein the steps are configured to fix the respective bearings therein.

4. A driving unit as claimed in claim 3, wherein the step formed at the front portion of the inner circumference of the bearing housing is configured to support a rear end of the front bearing, and the step formed at the rear portion of the inner circumference of the bearing housing is configured to support a front end of the rear bearing.

5. A driving unit as claimed in claim 1, wherein the at least one bearing comprises a front bearing and a rear bearing, and wherein the shaft has a front end portion fixed to a spider in a rear wall of the drum, and a region of the shaft between the spider and the front bearing comprises a brass bushing attached thereon.

6. A driving unit as claimed in claim 1, further comprising a stator supporter inserted between the rear wall of the tub and the stator.

7. A structure as claimed in claim 1, wherein the rotor is formed of steel or steel alloy plate.

8. A driving unit as claimed in claim 1, wherein the rotor comprises:

a bent portion formed along a circumference of the sidewall of the rotor, wherein the bent portion is configured for supporting magnets fitted to an inside of a front portion of the sidewall of the rotor.

9. A driving unit as claimed in claim 1, wherein the rotor comprises:

a plurality of cooling fins formed in the rear wall of the rotor, wherein each cooling fin is formed in a radial direction thereof and configured for blowing air toward the stator for cooling; and a plurality of cooling holes configured for ventilation.

10. A structure as claimed in claim 9, wherein the rotor further includes;

an embossing between adjacent cooling fins on the rear wall of the rotor for reinforcing the rotor, and a drain hole in each of the embossings, for drain of water.

11. A structure as claimed in claim 1, wherein the rotor further includes:

a hub at a center of the rear wall of the rotor having a hole therethrough configured to receive at least one fastening member for coupling the rotor to the shaft which passes therethrough, and fastening holes and positioning holes both formed around the through hole in the hub of the rotor at fixed intervals, the fastening holes for fastening a connector serration coupled to an outer circumference of the rear end portion of the shaft exposed to rear of the rear bearing, and the positioning holes for positioning an assembly position of the connector.

12. A structure as claimed in claim 11, wherein the connector further includes;

a serration formed in an inner circumference of the connector hub matched to the serration formed in the rear end portion of the shaft, and reinforcing ribs on an outer circumference of the connector hub for reinforcing the hub.

13. A structure as claimed in claim 11, wherein the connector is formed of plastic having a vibration mode different from the rotor.

14. A driving unit as claimed in claim 1, wherein the tub includes:

a hub comprising an external circumference defining an outer side of the hub, wherein the hub is fixed in the rear wall of the tub and has the bearing housing is inserted therein, and fastening bosses disposed on an outer side of the hub at fixed intervals and configured for fastening the stator to the rear wall of the tub with fastening members.

15. A structure as claimed in claim 1, wherein the magnetic core of the stator has segregated core pieces.

16. A driving unit in a drum type washing machine comprising:

a cabinet;

a tub of plastic mounted inside the cabinet;

a metallic bearing housing comprising a cylindrical aperture therethrough defining an internal circumference, wherein said metallic bearing housing is disposed in a central portion of a rear wall of the tub, and the metallic bearing housing further comprises steps on the inner circumference for supporting bearings therein;

a drum mounted inside the tub, wherein the drum comprises a rear wall;

a shaft connected to the drum for transmission of a driving power from a motor to the drum, wherein the shaft has a front bearing and a rear bearing, each of which are mounted on the outer circumference of the shaft at opposite ends thereof, respectively, and a front end portion fixed to a spider in a rear wall of the drum, a brass bushing press fit on a region of the shaft from a portion exposed between a rear of the spider and the front bearing for prevention of rusting of the shaft, and steps on an outer circumference thereof for fixing mounting positions of the front bearing and the rear bearing on the shaft;

a rotor comprising metal coupled to the rear end portion of the shaft, the rotor comprising:

a bent portion formed along a circumference of the rotor including a setting surface configured for supporting magnets fitted to an inside of a front portion of a sidewall of the rotor extended forward from a periphery of a rear wall of the rotor, and a hub at a center of the rear wall of the rotor having a hole therethrough for a fastening member, for coupling the rotor to the shaft, a plurality of cooling fins configured for blowing air toward the stator when the rotor is rotated, an embossing between adjacent cooling fins on the rear wall of the rotor for reinforcing the rotor, and a drain hole in each of the embossings,;

a stator fixed to the tub rear wall inward of the rotor;

a connector of plastic configured to connect the shaft to the rotor; and, a supporter fitted between the rear wall of the tub and the stator for supporting the stator and maintaining a concentricity between the stator and the tub when the stator is mounted to the tub rear wall.

17. A driving unit in a drum type washing machine comprising:
a cabinet;
a tub mounted inside the cabinet;
a drum mounted inside the tub;
a shaft connected to the drum configured for transmission of a driving force from a motor to the drum;
a front bearing and a rear bearing mounted on an outer circumference of the shaft at opposite end portions thereof, respectively;
a bearing housing comprising metal disposed in a central portion of a rear wall of the tub for supporting the front bearing;
a rotor fixed to the rear end portion of the shaft;
a stator fixed to the tub rear wall inward of the rotor and configured to magnetically communicate with the rotor;
a connector comprising at least one serration fixed between the outer circumference of the shaft in front of the rear bearing and the rotor, and configured, for transmission of a rotating power from the rotor to the shaft; and,
a bearing bracket fixed to the rear wall of the tub and configured to cover an outside of the rotor and to support the rear bearing.

18. A structure as claimed in claim 17, wherein the metallic bearing housing is mounted at a central portion of the rear wall of the tub of plastic as one unit by insert injection molding.

19. A driving unit in a drum type washing machine comprising:
a cabinet;
a tub of plastic mounted inside the cabinet;
a metallic bearing housing inserted into a central portion of a rear wall of the tub having steps on an inner circumference for supporting bearings therein;
a drum mounted inside of the tub;
a shaft connected to the drum and configured for transmission of a driving power from a motor to the drum, the shaft having a front bearing and a rear bearing mounted mounted on an outer circumference of the shaft at opposite end portions thereof, respectively, and having a front end portion fixed to a spider in the drum rear wall, and a brass bushing fitted on a region of the shaft from a portion exposed between the spider to the front bearing;
a rotor comprising metal coupled to the rear end portion of the shaft, the rotor comprising:
a bent portion formed along a circumference thereof having a setting surface configured for supporting magnets fitted to an inside of a front portion of a sidewall of the rotor extended forward from a periphery of a rear wall of the rotor, and
a hub at a center of the rear wall of the rotor having a hole therethrough configured to receive a fastening member, for coupling the rotor to the shaft,
a plurality of cooling fins formed around the hub and configured for blowing air toward the stator when the rotor is rotated,
an embossing between adjacent cooling fins on the rear wall of the rotor for reinforcing the rotor, and
a drain hole in each of the embossings;
a stator fixed to the tub rear wall inward of the rotor;
a connector comprising plastic configured to connect the shaft to the rotor;
a supporter fitted between the rear wall of the tub and the stator configured for supporting the stator and maintaining a concentricity between the tub and the stator when the stator is mounted to the tub rear wall; and,
a bearing bracket fixed to the rear wall of the tub to cover an outside of the rotor and support the rear bearing.

20. A driving unit for a drum type washing machine, comprising:
a cylindrical tub including an opened front, a closed rear wall, and a sidewall extending from a periphery of the rear wall to the opened front;
a drum mounted rotatably in the tub;
a shaft having one end connected to the drum;
a stator fixed at a central portion of the rear wall of the tub; and
a rotor attached to a rear end of the shaft, the rotor including a tear wall and a cylindrical sidewall attached to the rear wall, wherein the rotor includes:
a plurality of cooling fins integrated with the rear wall, the cooling fins being configured to blow cooling air toward the stator as the rotor is rotated; and
a plurality of through holes formed in the rear wall and configured for ventilation.

21. The driving unit of claim 20, wherein the cooling fins comprise portions of the rear wall that have been bent inward to form the cooling fins and the through holes.

22. The driving unit of claim 20, wherein the rotor further includes;
an embossing between adjacent cooling fins on the rear wall of the rotor for reinforcing the rotor, and
a drain hole in each of the embossings.

23. A washing machine driving unit, comprising:
a bearing housing;
a tub comprising a generally cylindrical enclosure with a hollow interior, an open first tub end and a closed second tub end, wherein the second tub end is molded around the bearing housing;
a stator attached to the exterior of the second tub end;
a shaft rotatably mounted within the bearing housing comprising a first shaft end protruding into the interior of the tub and a second shaft end protruding out the second tub end; and
a rotor attached to the second shaft end.

24. The washing machine driving unit of claim 23, wherein the first shaft end is coupled to a drum disposed in the interior of the tub, and the stator and the rotor are configured to cooperate to rotate the shaft within the bearing housing.

25. The washing machine driving unit of claim 23, further comprising a reinforcing member that is interposed between the exterior surface of the second tub end and the stator.

26. The washing machine driving unit of claim 23, further comprising a connector, wherein the connector is coupled to the second shaft end and the rotor is coupled to the connector.

27. The washing machine driving unit of claim 26, wherein the connector has a vibration mode different from a vibration mode of the rotor.

28. The washing machine driving unit of claim 27, wherein the connector comprises a resin.

29. The washing machine driving unit of claim 23, wherein the rotor further comprises a plurality of cooling fins and a plurality of ventilation holes.

30. The washing machine driving unit of claim 29, wherein both the cooling fins and the ventilation holes are formed by bending portions of a rear wall of the rotor inward towards the stator.

31. A washing machine driving unit, comprising:
- a bearing housing attached to a rear wall of a tub of the washing machine;
- a front bearing mounted in the bearing housing;
- a bearing bracket attached to the rear wall of the tub;
- a rear bearing mounted on the bearing bracket;
- a shaft mounted on the front and rear bearings;
- a stator attached to the rear wall of the tub; and
- a rotor attached to the shaft, wherein the rotor is located between the rear bearing and the stator.

32. The driving unit of claim 31, wherein the rear wall of the tub is molded around the bearing housing.

33. The driving unit of claim 31, wherein the rotor comprises:
- a cylindrical sidewall; and
- a substantially circular rear wall that is attached to the sidewall, wherein portions of the rear wall are bent inward to form apertures in the rear wall and to form cooling fins.

34. The driving unit of claim 31, wherein the bearing bracket covers the stator and the rotor.

* * * * *

(12) EX PARTE REEXAMINATION CERTIFICATE (7517th)
United States Patent
Kim et al.

(10) Number: US 6,460,382 C1
(45) Certificate Issued: May 18, 2010

(54) STRUCTURE OF DRIVING UNIT IN DRUM TYPE WASHING MACHINE

(75) Inventors: Jae Kyum Kim, Kyongsangnam-do (KR); Ho Cheol Kwon, Kyongsangnam-do (KR); Jong A Park, Kyongsangnam-do (KR); Kang Mo Choi, Kyongsangnam-do (KR)

(73) Assignee: LG Electronics Inc., Yoido-Dong, Youngdungpo-Gu, Seoul (KR)

Reexamination Request:
No. 90/009,331, Jan. 28, 2009

Reexamination Certificate for:
Patent No.: 6,460,382
Issued: Oct. 8, 2002
Appl. No.: 09/624,144
Filed: Jul. 21, 2000

(30) Foreign Application Priority Data

Oct. 18, 1999 (KR) ............................................. 99-45088
Oct. 18, 1999 (KR) ............................................. 99-45089

(51) Int. Cl.
*D06F 37/30* (2006.01)

(52) U.S. Cl. ........................................................ 68/140
(58) Field of Classification Search ........................ None
See application file for complete search history.

(56) References Cited

U.S. PATENT DOCUMENTS

| | | | |
|---|---|---|---|
| 2,531,225 A | 11/1950 | Le Tourneau |
| 2,656,702 A | 10/1953 | Chapin |
| 3,227,030 A | 6/1963 | Preziosi et al. |
| 3,138,727 A | 6/1964 | Ellner |
| 3,194,032 A | 7/1965 | Von Brimer |
| 3,248,908 A | 5/1966 | Pope |
| 3,333,443 A | 8/1967 | Chung et al. |
| 3,604,222 A | 9/1971 | Wutherich et al. |
| 3,840,764 A | 10/1974 | Burger |
| 3,914,963 A | 10/1975 | Brimer |
| 4,423,607 A | 1/1984 | Munini |
| 4,446,706 A | 5/1984 | Hartwig |
| 4,566,864 A | 1/1986 | Yamamoto et al. |
| 4,623,812 A | 11/1986 | van de Griend |
| 4,686,399 A | 8/1987 | Imori et al. |

(Continued)

FOREIGN PATENT DOCUMENTS

| | | |
|---|---|---|
| CH | 462 765 | 12/1966 |
| DE | 1 907 719 | 8/1970 |
| DE | 31 05 318 | 8/1982 |

(Continued)

OTHER PUBLICATIONS

European Patent Office 0 219 115 Apr. 1987.
European Patent Office 0 789 103 Aug. 1997.
European Search Report for EP 04 07 7356.
European Patent Office 0 354 158 Feb. 1990.
European Patent Office 0 374 519 Jun. 1990.

*Primary Examiner*—William C Doerrler

(57) ABSTRACT

Structure of driving unit in a drum type washing machine including a tub mounted inside of a cabinet, a drum mounted inside of the tub, a shaft connected to the drum mounted inside of the tub for transmission of a driving force from a motor to the drum, a front bearing and a rear bearing mounted on an outer circumference of the shaft at opposite end portions thereof respectively, a bearing housing built in a central portion of a rear wall of the tub for supporting the front bearing, a rotor composing the motor together with the rotor, and coupled to the rear end portion of the shaft, a stator fixed to the tub rear wall inward of the rotor to compose the motor together with the rotor, a connector serration coupled to the outer circumference of the shaft in front of the rear bearing and fixed to the rotor, for transmission of a rotating power from the rotor to the shaft, and a bearing bracket fixed to the rear wall of the tub to cover an outside of the rotor and support the rear bearing, thereby reducing noise, repair and power loss, by improving a structure of a driving unit, improving a product reliability, by improving a washing capability, and improving a productivity by improving workability in fabrication of components of the driving unit.

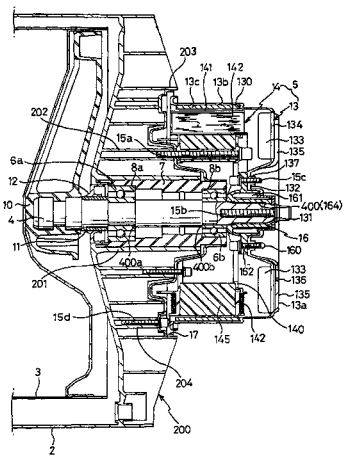

U.S. PATENT DOCUMENTS

| Patent | | Date | Inventor |
|---|---|---|---|
| 4,701,653 | A | 10/1987 | Merkle et al. |
| 4,701,654 | A | 10/1987 | Tatukawa et al. |
| 4,712,035 | A | 12/1987 | Forbes et al. |
| 4,734,604 | A | 3/1988 | Sontheimer et al. |
| 4,763,037 | A | 8/1988 | Hashimoto et al. |
| 4,853,571 | A | 8/1989 | Smith et al. |
| 4,995,598 | A | 2/1991 | Ingham |
| 4,998,052 | A | 3/1991 | Erdman et al. |
| 5,040,285 | A | 8/1991 | Williams et al. |
| 5,150,589 | A | 9/1992 | Williams et al. |
| 5,266,855 | A | 11/1993 | Smith et al. |
| 5,329,791 | A | 7/1994 | Cargnel et al. |
| 5,353,613 | A | 10/1994 | Smith et al. |
| 5,442,250 | A | 8/1995 | Stridsberg |
| 5,463,883 | A | 11/1995 | Pellerin et al. |
| 5,489,811 | A | 2/1996 | Kern et al. |
| 5,497,040 | A | 3/1996 | Sato |
| 5,528,092 | A | 6/1996 | Ohta |
| 5,586,455 | A | 12/1996 | Imai |
| 5,659,216 | A | 8/1997 | Bisantz |
| 5,677,816 | A | 10/1997 | Oh |
| 5,737,944 | A | 4/1998 | Nishimura et al. |
| 5,778,703 | A | 7/1998 | Imai et al. |
| 5,809,809 | A | 9/1998 | Neumann |
| 5,825,108 | A | 10/1998 | De Filippis |
| 5,862,686 | A | 1/1999 | Skrippek |
| 5,874,796 | A | 2/1999 | Petersen |
| 5,894,746 | A | 4/1999 | Skrippek |
| 5,907,206 | A | 5/1999 | Shiga et al. |
| 5,966,379 | A | 10/1999 | Phillips et al. |
| 5,975,846 | A | 11/1999 | Wistinghausen |
| 5,996,379 | A | 12/1999 | Skrippek |
| 6,006,553 | A | 12/1999 | Lee et al. |
| 6,023,839 | A | 2/2000 | Kinoshita |
| 6,049,930 | A | 4/2000 | Hisano et al. |
| 6,050,113 | A | 4/2000 | Skrippek et al. |
| 6,131,422 | A | 10/2000 | Skrippek et al. |
| 6,148,647 | A | 11/2000 | Kabeya et al. |
| 6,257,027 | B1 | 7/2001 | Imai |
| 6,339,275 | B1 | 1/2002 | Katagiri |
| 6,341,507 | B1 | 1/2002 | Rode et al. |
| 6,396,190 | B1 | 5/2002 | Ahn et al. |
| 6,626,014 | B2 | 9/2003 | Heyder et al. |
| 6,661,550 | B2 | 12/2003 | Konno et al. |
| 6,681,602 | B2 | 1/2004 | Heyder et al. |
| 7,380,424 | B2 | 6/2008 | Kim et al. |
| 7,444,841 | B2 | 11/2008 | Kim et al. |
| 2002/0194884 | A1 | 12/2002 | Heyder et al. |
| 2006/0196233 | A1 | 9/2006 | Kim et al. |
| 2007/0113597 | A1 | 5/2007 | Kim |
| 2007/0125135 | A1 | 6/2007 | Kim et al. |

FOREIGN PATENT DOCUMENTS

| Country | Number | Date |
|---|---|---|
| DE | 36 14 703 | 11/1986 |
| DE | 36 34 214 | 4/1988 |
| DE | 43 35 966 | 4/1995 |
| DE | 43 41 832 | 6/1995 |
| DE | 197 24 475 | 12/1998 |
| DE | 10 05 8409 | 5/2002 |
| DE | 100 58 409 | 5/2002 |
| EP | 0 043 429 | 1/1982 |
| EP | 0 198 554 | 10/1986 |
| EP | 0 219 115 | 4/1987 |
| EP | 0 198 554 | 10/1988 |
| EP | 0 354 158 | 2/1990 |
| EP | 0 361 775 | 4/1990 |
| EP | 0 374 519 | 6/1990 |
| EP | 0 620 308 | 10/1994 |
| EP | 0 629 735 | 12/1994 |
| EP | 0 657 575 | 11/1995 |
| EP | 0 780 507 | 6/1997 |
| EP | 0 789 103 | 8/1997 |
| EP | 0 953 668 | 11/1999 |
| EP | 1 094 144 | 12/2003 |
| EP | 1 548 171 | 6/2005 |
| EP | 1 619 286 | 1/2006 |
| GB | 0 701 511 | 12/1953 |
| GB | 2 006 836 | 5/1979 |
| GB | 2 030 896 | 4/1980 |
| GB | 2 189 511 | 10/1987 |
| GB | 2 202 867 | 10/1988 |
| GB | 2 261 881 | 6/1993 |
| GB | 2 272 913 | 6/1994 |
| GB | 2 322 240 | 8/1998 |
| GB | 2 202 867 | 10/1998 |
| GB | 2 332 212 | 6/1999 |
| GB | 2 333 300 | 7/1999 |
| JP | 58-207834 | 12/1983 |
| JP | 59-035548 | 2/1984 |
| JP | 60-005197 | 1/1985 |
| JP | 61-017877 | 2/1986 |
| JP | 61-236350 | 10/1986 |
| JP | 02-14278 | 1/1990 |
| JP | 02-014278 | 1/1990 |
| JP | 04-033536 | 2/1992 |
| JP | 04-317547 | 11/1992 |
| JP | 05-176488 | 7/1993 |
| JP | 05-1076488 | 7/1993 |
| JP | 61-017877 | 4/1994 |
| JP | 07-68086 | 3/1995 |
| JP | 07-068086 | 3/1995 |
| JP | 07-259866 | 10/1995 |
| JP | 08-019229 | 1/1996 |
| JP | 09-098547 | 4/1997 |
| JP | 09-103596 | 4/1997 |
| JP | 09-182368 | 7/1997 |
| JP | 10-210727 | 8/1998 |
| JP | 11-028298 | 2/1999 |
| JP | 11-089198 | 3/1999 |
| JP | 11-0089198 | 3/1999 |
| JP | 11-137884 | 5/1999 |
| JP | 11-207077 | 8/1999 |
| JP | 11-207086 | 8/1999 |
| JP | 11-239692 | 9/1999 |
| JP | 11-276777 | 10/1999 |
| JP | 11-285205 | 10/1999 |
| JP | 2000-042287 | 2/2000 |
| JP | 11-28287 | 11/2000 |
| JP | 11-028287 | 11/2000 |
| JP | 2000-325693 | 11/2000 |
| JP | 2000-77232 | 12/2000 |
| JP | 2000-334194 | 12/2000 |
| JP | 10-2000-0077232 | 12/2000 |
| JP | 2003-326083 | 11/2003 |
| KR | 1998-0058943 | 10/1998 |
| KR | 10-1998-0058943 | 10/1998 |
| KR | 10-1999-0030909 | 5/1999 |
| KR | 10-1997-0051370 A | 10/1999 |
| KR | 2000-77232 | 12/2000 |
| KR | 10-2000-0077232 | 12/2000 |
| WO | WO 95/17543 | 6/1995 |
| WO | WO 98/00902 | 1/1998 |
| WO | WO 98/36123 | 8/1998 |
| WO | WO 98/56973 | 12/1998 |
| WO | WO 98/56974 | 12/1998 |
| WO | WO 98/59102 | 12/1998 |
| WO | WO 01/044556 | 6/2001 |

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 17, 19 and 31–34 is confirmed.

Claim 24 is cancelled.

Claims 1, 2, 6–8, 10–16, 18, 20 and 23 are determined to be patentable as amended.

Claims 3–5, 9, 21, 22 and 25–30, dependent on an amended claim, are determined to be patentable.

New claims 35–89 are added and determined to be patentable.

1. A driving unit in a drum type washing machine comprising:
   a tub comprising plastic and including an opened front, a closed rear wall, and a sidewall extending from a periphery of the rear wall to the opened front, wherein the tub is cylindrical;
   a drum mounted rotatably in the tub;
   a bearing housing comprising metal, and including a cylindrical aperture therethrough defining an inner circumference, wherein the bearing housing is mounted proximate to a central portion of the rear wall of the tub by insert injection molding;
   a shaft passing through the bearing housing, the shaft having one end *directly* connected to the drum;
   at least one bearing mounted between the shaft and the bearing housing for supporting the shaft;
   a stator fixed at a central portion of the rear wall of the tub, the stator including a magnetic core having a stack of layers of magnetic material and a winding part having a coil wound thereon for forming a magnetic force; and
   a rotor comprising a sidewall, a rear wall and a permanent magnet fixed to the sidewall of the rotor, wherein the rotor is *directly* coupled to *the other end of* the shaft.

2. A [structure] *driving unit* as claimed in claim 1, wherein the metal bearing housing is formed of an alloy of aluminum.

6. A driving unit as claimed in claim 1, further comprising a stator supporter *separately* inserted between the rear wall of the tub and stator.

7. A [structure] *driving unit* as claimed in claim 1, wherein the rotor is formed of steel or steel alloy plate.

8. A driving unit as claimed in claim 1, wherein the rotor comprises:
   a bent portion formed along a circumference of the sidewall of the rotor, wherein the bent portion is configured for supporting magnets fitted to an inside of a front portion of the sidewall of the rotor, *and wherein the sidewall and the rear wall of the rotor are entirely formed of metal*.

10. A [structure] *driving unit* as claimed in claim 9, wherein the rotor further includes;
   an embossing between adjacent cooling fins on the rear wall of the rotor for reinforcing the rotor, and
   a drain hole in each of the embossings, for drain of water.

11. A [structure] *driving unit* as claimed in claim 1, wherein the rotor further includes:
   a hub at a center of the rear wall of the rotor having a hole therethrough configured to receive at least one fastening member for coupling the rotor to the shaft which passes therethrough, and
   fastening holes and positioning holes both formed around the through hole in the hub of the rotor at fixed intervals, the fastening holes for fastening a connector serration coupled to an outer circumference of the rear end portion of the shaft exposed to rear of the rear bearing, and the positioning holes for positioning an assembly position of the connector.

12. A [structure] *driving unit* as claimed in claim 11, wherein the connector further includes[:]*:*
   a serration formed in an inner circumference of the connector hub matched to the serration formed in the rear end portion of the shaft, and
   reinforcing ribs on an outer circumference of the connector hub for reinforcing the hub.

13. A [structure] *driving unit* as claimed in claim 11, wherein the connector is formed of plastic having a vibration mode different from the rotor.

14. A driving unit as claimed in claim 1, wherein the tub includes:
   a hub comprising an external circumference defining an outer side of the hub, wherein the hub is fixed in the rear wall of the tub and has the bearing housing is inserted therein, and
   fastening bosses disposed on [an] *the* outer side of the hub at fixed intervals and configured for fastening the stator to the rear wall of the tub with fastening members.

15. A [structure] *driving unit* as claimed in claim 1, wherein the magnetic core of the stator has segregated core pieces.

16. A driving unit in a drum type washing machine comprising:
   a cabinet;
   a tub of plastic mounted inside the cabinet;
   a metallic bearing housing comprising a cylindrical aperture therethrough defining an internal circumference, wherein said metallic bearing housing is disposed in a central portion of a rear wall of the tub, and the metallic bearing housing further comprises steps on the inner circumference for supporting bearings therein;
   a drum mounted inside the tub, wherein the drum comprises a rear wall;
   a shaft connected to the drum for transmission of a driving power from a motor to the drum, wherein the shaft has a front bearing and a rear bearing, each of which are mounted on the outer circumference of the shaft at opposite ends thereof, respectively, and a front end portion fixed to a spider in a rear wall of the drum, a brass bushing press fit on a region of the shaft from a portion exposed between a rear of the spider and the front bearing for prevention of rusting of the shaft, and steps on an outer circumference thereof for fixing mounting positions of the front bearing and the rear bearing on the shaft;

a rotor comprising metal coupled to the rear end portion of
the shaft, the rotor comprising:
a bent portion formed along a circumference of the
rotor including a setting surface configured for supporting magnets fitted to an inside of a front portion
of a sidewall of the rotor extended forward from a
periphery of a rear wall of the rotor, and
a hub at a center of the rear wall of the rotor having a
hole therethrough for a fastening member, for coupling the rotor to the shaft,
a plurality of cooling fins configured for blowing air
toward the stator when the rotor is rotated,
an embossing between adjacent cooling fins on the rear
wall of the rotor for reinforcing the rotor, and
a drain hole in each of the embossings,[;]
a stator fixed to the tub rear wall inward of the rotor;
a connector of plastic configured to connect the shaft to
the rotor; and,
a supporter fitted between the rear wall of the tub and the
stator for supporting the stator and maintaining a concentricity between the stator and the tub when the stator
is mounted to the tub rear wall.

18. A [structure] *driving unit* as claimed in claim 17,
wherein the metallic bearing housing is mounted at a central
portion of the rear wall of the tub of plastic as one unit by
insert injection molding.

20. A driving unit for a drum type washing machine, comprising:
a cylindrical tub including an opened front, a closed rear
wall, and a sidewall extending from a periphery of the
rear wall to the opened front;
a drum mounted rotatably in the tub;
a shaft having one end *directly* connected to the drum;
a stator fixed at a central portion of the rear wall of the tub;
and
a rotor *directly* attached to a rear end of the shaft, the rotor
including a [tear] *rear* wall and a cylindrical sidewall
attached to the rear wall, wherein the rotor includes:
a plurality of cooling fins integrated with the rear wall
*of the rotor*, the cooling fins being configured to blow
cooling air toward the stator as the rotor is rotated;
and
a plurality of through holes formed in the rear wall *of the
rotor* and configured for ventilation.

23. A washing machine driving unit, comprising:
a bearing housing;
a tub comprising a generally cylindrical enclosure with a
hollow interior, an open first tub end and a closed second tub end, wherein the second tub end is molded
around the bearing housing;
a stator attached to the exterior of the second tub end;
a shaft rotatably mounted within the bearing housing
comprising a first shaft end protruding into the interior
of the tub and a second shaft end protruding out the
second tub end; and
a rotor *directly* attached to the second shaft end, *wherein
the first shaft end is directly coupled to a drum disposed
in the interior of the tub, and the stator and the rotor
are configured to cooperate to rotate the shaft within
the bearing housing.*

35. The driving unit of claim 1, wherein *a supporter is
separately inserted between the rear wall of the tub and the
stator, the rear wall of the tub includes a hub having an
external circumference defining an outer side of the hub, and
the hub is fixed in the rear wall of the tub and has the bearing
housing inserted therein.*

36. The driving unit of claim 35, *wherein the rear wall of
the tub includes fastening bosses disposed on the outer side
of the hub at fixed intervals and configured for fastening the
stator with fastening members.*

37. The driving unit of claim 1, *further comprises a supporter separately inserted between the rear wall of the tub
and the stator for maintaining a concentricity between the
stator and the tub.*

38. The driving unit of claim 1, *further comprising a supporter separately fitted between the rear wall of the tub and
the stator for supporting the stator and maintaining a concentricity between the stator and the tub.*

39. The driving unit of claim 1, *wherein the one end of the
shaft is directly connected to a spider of the drum.*

40. The driving unit of claim 1, *wherein the other end of
the shaft is directly coupled to a connector of the rotor.*

41. The driving unit of claim 40, *wherein the connector is
made of resin.*

42. The driving unit of claim 20, *wherein the one end of
the shaft is directly connected to a spider of the drum.*

43. The driving unit of claim 20, *wherein the rear end of
the shaft is directly attached to a connector of the rotor.*

44. The driving unit of claim 23, *wherein the first shaft end
is directly coupled to a spider of the drum.*

45. The driving unit of claim 1, *wherein the tub further
includes a hub comprising an external circumference defining an outer side of the hub, wherein the hub is fixed in the
rear wall of the tub and has the bearing housing inserted
therein, and fastening bosses disposed on the outer side of
the hub at fixed intervals and configured for fastening the
stator with fastening members.*

46. The driving unit of claim 45, *wherein the outer side of
the hub corresponds to an area between the bearing housing
and the fastening bosses.*

47. The driving unit of claim 14, *wherein a rear portion of
the bearing housing where the second shaft end protrudes
out of the second tub end has an inner circumference and an
outer circumference, the outer circumference of the rear portion of the bearing housing being smaller than the external
circumference of the hub.*

48. The driving unit of claim 47, *wherein fastening bosses
disposed on the outer side of the hub are adjacent to the
outer circumference.*

49. The driving unit of claim 14, *wherein the outer side of
the hub corresponds to an area between the bearing housing
and the fastening bosses.*

50. The driving unit of claim 20, *wherein the tub further
includes: a hub comprising an external circumference defining an outer side of the hub, wherein the hub is fixed in the
rear wall of the tub and has the bearing housing is inserted
therein, and fastening bosses disposed on the outer side of
the hub at fixed intervals and configured for fastening the
stator with fastening members.*

51. The driving unit of claim 50, *wherein the outer side of
the hub corresponds to an area between the bearing housing
and the fastening bosses.*

52. The driving unit of claim 50, *wherein a rear portion of
the bearing housing where the second shaft end protrudes
out of the second tub end has an inner circumference and an
outer circumference, the outer circumference of the rear portion of the bearing housing being smaller than the external
circumference of the hub.*

53. The driving unit of claim 52, *wherein fastening bosses
disposed on the outer side of the hub are adjacent to the
outer circumference.*

54. *A driving unit in a drum type washing machine comprising:* a tub comprising plastic and including an opened front, a closed rear wall, and a sidewall extending from a periphery of the rear wall to the opened front, wherein the tub is cylindrical;

a drum mounted rotatably in the tub;

a bearing housing comprising metal, and including a cylindrical aperture therethrough defining an inner circumference, wherein the bearing housing is mounted proximate to a central portion of the rear wall of the tub by insert injection molding;

a shaft passing through the bearing housing, the shaft having one end connected to the drum;

at least one bearing mounted between the shaft and the bearing housing for supporting the shaft;

a stator fixed at a central portion of the rear wall of the tub, the rotator including a magnetic core having a stack of layers of magnetic material and a winding part having a coil wound thereon for forming a magnetic force; and a rotor comprising a sidewall, a rear wall and a permanent magnet fixed to the sidewall of the rotor, wherein the rotor is coupled the other end of the shaft, and the tub further includes:

a hub comprising an external circumference defining an outer side of the hub, wherein the hub is fixed in the rear wall of the tub and has the bearing housing is inserted therein, and fastening bosses disposed on the outer side of the hub at fixed intervals and configured for fastening the stator with fastening members.

55. The driving unit of claim 54, further comprises a supporter separately inserted between the rear wall of the tub and the stator for maintaining a concentricity between the stator and the tub.

56. The driving unit of claim 54, further comprising a supporter separately fitted between the rear wall of the tub and the stator for supporting the stator and maintaining a concentricity between the stator and the tub.

57. The driving unit of claim 54, wherein the outer side of the hub corresponds to an area between the bearing housing and the fastening bosses.

58. The driving unit of claim 54, wherein a rear portion of the bearing housing where the second shaft end protrudes out of the second tub end has an inner circumference and an outer circumference, the outer circumference of the rear portion of the bearing housing being smaller than the external circumference of the hub.

59. The driving unit of claim 58, wherein the fastening bosses disposed on the outer side of the hub are adjacent to the outer circumference.

60. A driving unit in a drum type washing machine comprising:

a tub comprising plastic and including an opened front, a closed rear wall, and a sidewall extending from a periphery of the rear wall to the opened front, wherein the tub is cylindrical;

a drum mounted rotatably in the tub;

a bearing housing comprising metal, and including a cylindrical aperture therethrough defining an inner circumference, wherein the bearing housing is mounted proximate to a central portion of the rear wall of the tub by insert injection molding;

a shaft passing through the bearing housing, the shaft having one end connected to the drum;

at least one bearing mounted between the shaft and the bearing housing for supporting the shaft;

a stator fixed at a central portion of the rear wall of the tub, the stator including a magnetic core having a stack of layers of magnetic material and a winding part having a coil wound thereon for forming a magnetic force; and a rotor comprising a sidewall, a rear wall and a permanent magnet fixed to the sidewall of the rotor, wherein the rotor is coupled the shaft, and the rotor further includes:

an embossing between adjacent cooling fans on the rear wall of the rotor for reinforcing the rotor, and a drain hole in each of the embossings for draining of water.

61. A driving unit in a drum type washing machine comprising:

a tub comprising plastic and including an opened front, a closed rear wall, and a sidewall extending from a periphery of the rear wall to the opened front, wherein the tub is cylindrical;

a drum mounted rotatably in the tub;

a bearing housing comprising metal, and including a cylindrical aperture therethrough defining an inner circumference, wherein the bearing housing is mounted proximate to a central portion of the rear wall of the tub by insert injection molding;

a shaft passing through the bearing housing, the shaft having one end connected to the drum;

at least one bearing mounted between the shaft and the bearing housing for supporting the shaft;

a stator fixed at a central portion of the rear wall of the tub, the stator including a magnetic core having a stack of layers of magnetic material and a winding part having a coil wound thereon for forming a magnetic force; and a rotor comprising a sidewall, a rear wall and a permanent magnet fixed to the sidewall of the rotor, wherein the rotor is coupled the shaft, and the rotor further includes:

a hub at a center of the rear wall of the rotor having a hole therethrough configured to receive at least one fastening member for coupling the rotor to the shaft which passes therethrough, and fastening holes and positioning holes both formed around the through hole in the hub of the rotor at fixed intervals, the fastening holes for fastening a connector coupled to an outer circumference of the rear end portion of the shaft exposed to rear of the rear bearing, and the positioning holes for positioning an assembly position of the connector.

62. A driving unit for a drum type washing machine, comprising:

a cylindrical tub including an opened front, a closed rear wall, and a sidewall extending from a periphery, of the rear wall to the opened front:

a drum mounted rotatably in the tub;

a shaft having one end connected to the drum;

a stator fixed at a central portion of the rear wall of the tub; and a rotor attached to a rear end of the shaft, the rotor including a rear wall and a cylindrical sidewall attached to the rear wall, wherein the rotor includes:

a plurality of cooling fins integrated with the rear wall of the rotor, the cooling fins being configured to blow cooling air toward the stator as the rotor is rotated; and a plurality of through holes formed in the rear wall of
the rotor and configured for ventilation, wherein the
tub further includes:
a hub comprising an external circumference defining
an outer side of the hub, wherein the tub is fixed in
the rear wall of the tub and has the bearing housing
inserted therein, and
fastening bosses disposed on the outer side of the hub at
fixed intervals and configured for fastening the stator
with fastening members.

63. The driving unit of claim 62, further comprises a supporter separately inserted between the rear wall of the tub and the stator for maintaining a concentricity between the stator and the tub.

64. The driving unit of claim 62, further comprising a supporter separately fitted between the rear wall of the tub and the stator for supporting the stator and maintaining a concentricity between the stator and the tub.

65. The driving unit of claim 62, wherein the outer side of the hub correspond to an area between the bearing housing and the fastening bosses.

66. The driving unit of claim 62, wherein a rear portion of the bearing housing where the second shaft end protrudes out of the second tub end has an inner circumference and an outer circumference, the outer circumference of the rear portion of the bearing housing being smaller than the external circumference of the hub.

67. The driving unit of claim 66, wherein fastening bosses disposed on the outer side of the hub are adjacent to the outer circumference.

68. A washing machine driving unit, comprising:
a bearing housing;
a tub comprising a generally cylindrical enclosure with a hollow interior, an open first tub end and a closed second tub end, wherein the second tub end is molded around the bearing housing;
a stator attached to the exterior of the second tub end;
a shaft rotatably mounted within the bearing housing comprising a first shaft end protruding into the interior of the tub and a second shaft end protruding out the second tub end;
a rotor attached to the second shaft end; and
a reinforcing member that is interposed between the exterior surface of the second tub end and the stator.

69. The driving unit of claim 68, further comprises a supporter separately inserted between the rear wall of the tub and the stator for maintaining a concentricity between the stator and the tub.

70. The driving unit of claim 68, further comprising a supporter separately fitted between the rear wall of the tub and the stator for supporting the stator and maintaining a concentricity between the stator and the tub.

71. The driving unit of claim 68, wherein the tub further includes:
a hub comprising an external circumference defining an outer side of the hub, wherein the hub is fixed in the rear wall of the tub and has the bearing housing is inserted therein, and fastening bosses disposed on the outer side of the hub at fixed intervals and configured for fastening the stator with fastening members.

72. The driving unit of claim 71, wherein the outer side of the hub corresponds to an area between the bearing housing and the fastening bosses.

73. The driving unit of claim 71, wherein a rear portion of the bearing housing where the second shaft end protrudes out of the second tub end has an inner circumference and an outer circumference, the outer circumference of the rear portion of the bearing housing being smaller than the external circumference of the hub.

74. The driving unit of claim 73, wherein fastening bosses disposed on the outer side of the hub are adjacent to the outer circumference.

75. A washing machine driving unit, comprising:
a bearing housing;
a tub comprising a generally cylindrical enclosure with a hollow interior, an open first tub end and a closed second tub end, wherein the second tub end is molded around the bearing housing;
a stator attached to the exterior of the second tub end;
a shaft rotatably mounted within the bearing housing comprising a first shaft end protruding into the interior of the tub and a second shaft end protruding out the second tub end;
a rotor attached to the second shaft end; and
a connector, wherein the connector is coupled to the second shaft end and the rotor is coupled to the connector wherein the connector has a vibration mode different from a vibration mode of the rotor.

76. The washing machine driving unit of claim 75, wherein the connector comprises a resin.

77. A driving unit in a drum type washing machine comprising:
a tub comprising plastic and including an opened front, a closed rear wall, and a sidewall extending from a periphery of the rear wall to the opened front, wherein the tub is cylindrical;
a drum mounted rotatably in the tub;
a bearing housing comprising metal, and including a cylindrical aperture therethrough defining an inner circumference, wherein the bearing housing is mounted proximate to a central portion of the rear wall of the tub by insert injection molding;
a shaft passing through the bearing housing, the shaft having one end connected to the drum;
at least one bearing mounted between the shaft and the bearing housing for supporting the shaft;
a stator fixed at a central portion of the rear wall of the tub, the stator including a magnetic core having a stack of layers of magnetic material and a winding part having a coil wound thereon for forming a magnetic force;
a rotor comprising a sidewall, a rear wall and a permanent magnet fixed to the sidewall of the rotor, wherein the rotor is coupled the shaft; and
a stator supporter separately inserted between the rear wall of the tub and the stator.

78. The driving unit of claim 77, further comprises a supporter to maintain a concentricity between the stator and the tub.

79. The driving unit of claim 77, further comprising a supporter separately fitted between the rear wall of the tub and the stator for supporting the stator and maintaining a concentricity between the stator and the tub.

80. The driving unit of claim 77, wherein the tub further includes:
a hub comprising an external circumference defining an outer side of the hub, wherein the hub is fixed in the rear wall of the tub and has the bearing housing is inserted therein, and fastening bosses disposed on the outer side of the hub at fixed intervals and configured for fastening the stator with fastening members.

81. The driving unit of claim 80, wherein the outer side of the hub corresponds to an area between the bearing housing and the fastening bosses.

82. The driving unit of claim 80, wherein a rear portion of the bearing housing where the second shaft end protrudes out of the second tub end has an inner circumference and an outer circumference, the outer circumference of the rear portion of the bearing housing being smaller than the external circumference of the hub.

83. The driving unit of claim 82, wherein fastening bosses disposed on the outer side of the hub are adjacent to the outer circumference.

84. A driving unit in a drum type washing machine comprising:

a tub comprising plastic and including an opened front, a closed rear wall, and a sidewall extending from a periphery of the rear wall to the opened front, wherein the tub is cylindrical;

a drum mounted rotatably in the tub;

a bearing housing comprising metal, and including a cylindrical aperture therethrough defining an inner circumference, wherein the bearing housing is mounted proximate to a central portion of the rear wall of the tub by insert injection molding;

a shaft passing through the bearing housing, the shaft having one end connected to the drum;

at least one bearing mounted between the shaft and the bearing housing for supporting the shaft;

a stator fixed at a central portion of the rear wall of the tub, the stator including a magnetic core having a stack of layers of magnetic material and a winding part having a coil wound thereon for forming a magnetic force; and a rotor comprising a sidewall, a rear wall and a permanent magnet fixed to the sidewall of the rotor, wherein the rotor is coupled the shaft, wherein the sidewall and the rear wall of the rotor are entirely formed of steel or steel alloy plate.

85. A driving unit in a drum type washing machine comprising:

a tub comprising plastic and including an opened front, a closed rear wall, and a sidewall extending from a periphery, of the rear wall to the opened front, wherein the tub is cylindrical;

a drum mounted rotatably in the tub;

a bearing housing comprising metal, and including a cylindrical aperture therethrough defining an inner circumference, wherein the bearing housing is mounted proximate to a central portion of the rear wall of the tub by insert injection molding;

a shaft passing through the bearing housing, the shaft having one end connected to the drum;

at least one bearing mounted between the shaft and the bearing housing for supporting the shaft;

a stator fixed at a central portion of the rear wall of the tub, the stator including a magnetic core having a stack of layers of magnetic material and a winding part having a coil wound thereon for forming a magnetic force; and a rotor comprising a sidewall, a rear wall and a permanent magnet fixed to the sidewall of the rotor, wherein the rotor is coupled to the shaft and the rotor further includes:

a hub at a center of the rear wall of the rotor having a hole therethrough configured to receive at least one fastening member for coupling the rotor to the shaft which passes therethrough, and fastening holes and positioning holes both formed around the through hole in the hub of the rotor at fixed intervals, the fastening holes for fastening a connector coupled to an outer circumference of the rear end portion of the shaft exposed to the rear of the rear bearing, and the positioning holes for positioning an assembly position of the connector, wherein the connector further includes a serration formed in an inner circumference of the connector hub matched to a serration formed in the rear end portion of the shaft, and reinforcing ribs on an outer circumference of the connector hub for reinforcing the hub.

86. A driving unit in a drum type washing machine comprising: a tub comprising plastic and including an opened front, a closed rear wall, and a sidewall extending from a periphery, of the rear wall to the opened front, wherein the tub is cylindrical a drum mounted rotatably in the tub; a bearing housing comprising metal, and including a cylindrical aperture therethrough defining an inner circumference, wherein the bearing housing is mounted proximate to a central portion of the rear wall of the tub by insert injection molding;

a shaft passing through the bearing housing, the shaft having one end directly connected to the drum;

at least one bearing mounted between the shaft and the bearing housing for supporting the shaft;

a stator fixed at a central portion of the rear wall of the tub, the stator including a magnetic core having a stack of layers of magnetic material and a winding part having a coil wound thereon for forming a magnetic force;

a rotor comprising a sidewall, a rear wall and a permanent magnet fixed to the sidewall of the rotor, wherein the rotor is directly coupled to the other end of the shaft; and a connector to directly couple the rotor to the other end of the shaft, wherein the connector includes a serration formed in an inner circumference of a connector hub matched to a serration formed in the rear end portion of the shaft, and reinforcing ribs on an outer circumference of the connector hub for reinforcing the hub.

87. A driving unit in a drum type washing machine comprising:

a tub comprising plastic and including an opened front, a closed rear wall, and a sidewall extending from a periphery of the rear wall to the opened front, wherein the tub is cylindrical;

a drum mounted rotatably in the tub; a bearing housing comprising metal, and including a cylindrical aperture therethrough defining an inner circumference, wherein the bearing housing is mounted proximate to a central portion of the rear wall of the tub by insert injection molding;

a shaft passing through the bearing housing, the shaft having one end directly connected to the drum;

at least one bearing mounted between the shaft and the bearing housing for supporting the shaft;

a stator fixed at a central portion of the rear wall of the tub, the stator including a magnetic core having a stack of layers of magnetic material and a winding part having a coil wound thereon for forming a magnetic force;

a rotor comprising a sidewall, a rear wall and a permanent magnet fixed to the sidewall of the rotor, wherein the rotor is directly coupled to the other end of the shaft; and a connector to directly couple the rotor to the other end of the shaft, wherein the connector is made of plastic having a vibration mode different from the rotor.

88. A washing machine driving unit, comprising:

a bearing housing;

a tub comprising a generally cylindrical enclosure with a hollow interior, an open first tub end and a closed second tub end, wherein the second tub end is molded around the bearing housing;

a stator attached to the exterior of the second tub end;

a shaft rotatably mounted within the bearing housing comprising a first shaft end protruding into the interior of the tub and a second shaft end protruding out the second tub end; and a rotor fixed to the second shaft end, wherein the first shaft end is fixed to a drum disposed in the interior of the tub, and the stator and the rotor are configured to cooperate to directly rotate the shaft within the bearing housing, wherein a connector fixes the rotor to the second shaft end, and the connector includes a serration formed in an inner circumference of the connector matched to a serration formed on the second shaft end, and reinforcing ribs formed between the inner circumference of the connector and an outer circumference of the connector.

89. The washing machine driving unit of claim 88, wherein the connector is made of resin.

* * * * *